(12) United States Patent
Nakatani et al.

(10) Patent No.: US 10,387,086 B2
(45) Date of Patent: Aug. 20, 2019

(54) INFORMATION PROCESSING APPARATUS, INFORMATION PROCESSING SYSTEM, AND NON-TRANSITORY COMPUTER READABLE MEDIUM

(71) Applicant: FUJI XEROX CO., LTD., Tokyo (JP)

(72) Inventors: Toru Nakatani, Kanagawa (JP); Takeshi Ogura, Kanagawa (JP); Koji Hashimoto, Kanagawa (JP); Aiko Nozue, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/499,225

(22) Filed: Apr. 27, 2017

(65) Prior Publication Data

US 2018/0101340 A1 Apr. 12, 2018

(30) Foreign Application Priority Data

Oct. 6, 2016 (JP) .................................. 2016-198020

(51) Int. Cl.
*G06F 8/61* (2018.01)
*G06F 3/0481* (2013.01)
(Continued)

(52) U.S. Cl.
CPC .......... *G06F 3/1225* (2013.01); *G06F 3/0482* (2013.01); *G06F 3/0486* (2013.01);
(Continued)

(58) Field of Classification Search
CPC ..... G06F 8/60; G06F 8/61; G06F 8/65; G06F 8/671; G06F 8/68; G06F 9/44505;
(Continued)

(56) References Cited

U.S. PATENT DOCUMENTS 5,699,494 A * 12/1997 Colbert ................. G06F 3/1293
358/1.13
7,953,818 B2 * 5/2011 Chang ................... G06F 3/1204
709/217

(Continued)

FOREIGN PATENT DOCUMENTS

JP 2008-243179 A 10/2008

*Primary Examiner* — Ziaul A Chowdhury
(74) *Attorney, Agent, or Firm* — Oliff PLC

(57) ABSTRACT

An information processing apparatus connected to a device and a server via a network includes a first acquiring unit that acquires information related to the device from the device; a second acquiring unit that acquires information about application software from the server; and a display controller that performs control to display image information expressing the device, the information about which is acquired by the first acquiring unit, and image information expressing the application software, the information about which is acquired by the second acquiring unit, in a form of a list. The display controller performs control to vary a display mode of at least one of the image information expressing the device and the image information expressing the application software between a case where the application software is installable into the device and a case where the application software is not installable into the device.

13 Claims, 29 Drawing Sheets

(51) Int. Cl.
*G06F 3/0482* (2013.01)
*G06F 3/0484* (2013.01)
*G06F 3/0486* (2013.01)
*G06F 3/12* (2006.01)
*H04N 1/00* (2006.01)

(52) U.S. Cl.
CPC ...... *G06F 3/04817* (2013.01); *G06F 3/04842* (2013.01); *G06F 3/123* (2013.01); *G06F 3/1204* (2013.01); *G06F 3/1222* (2013.01); *G06F 3/1239* (2013.01); *G06F 3/1286* (2013.01); *G06F 3/1293* (2013.01); *G06F 8/61* (2013.01); *G06F 8/63* (2013.01); *H04N 1/00413* (2013.01)

(58) Field of Classification Search
CPC ...... G06F 3/123; G06F 3/1225; G06F 3/1204; G06F 3/1222; G06F 3/1286; G06F 3/0482; G06F 3/04842; G06F 3/0486; H04N 1/00413
See application file for complete search history.

(56) References Cited

U.S. PATENT DOCUMENTS

| | | | | |
|---|---|---|---|---|
| 8,286,160 B2* | 10/2012 | Asai | G06F 9/44505 | 717/171 |
| 8,352,608 B1* | 1/2013 | Keagy | G06F 8/63 | 709/226 |
| 8,677,249 B2* | 3/2014 | Buttner | G06F 3/0481 | 715/748 |
| 8,762,988 B2 | 6/2014 | Kong et al. | | |
| 9,424,367 B2* | 8/2016 | Baarz | G06F 16/904 | |
| 9,465,603 B2* | 10/2016 | Jin | G06F 8/65 | |
| 9,851,962 B2* | 12/2017 | Boss | G06F 8/61 | |
| 10,025,574 B1* | 7/2018 | Sargent | G06F 8/61 | |
| 2003/0009754 A1* | 1/2003 | Rowley | G06F 8/61 | 717/177 |
| 2006/0150182 A1* | 7/2006 | Hughes | G06F 8/61 | 717/174 |
| 2006/0155672 A1* | 7/2006 | Lee | G06F 8/61 | |
| 2006/0184619 A1* | 8/2006 | Tano | G06F 8/61 | 709/203 |
| 2006/0230314 A1* | 10/2006 | Sanjar | G06F 8/61 | 714/26 |
| 2007/0208863 A1* | 9/2007 | Otsuka | H04N 1/00222 | 709/227 |
| 2009/0172101 A1* | 7/2009 | Arthursson | G06F 3/0486 | 709/205 |
| 2009/0195815 A1* | 8/2009 | Naito | H04N 1/00413 | 358/1.15 |
| 2010/0192234 A1* | 7/2010 | Sugimoto | G06F 21/6209 | 726/30 |
| 2011/0102836 A1* | 5/2011 | Kawaura | G06F 3/1204 | 358/1.15 |
| 2011/0145812 A1* | 6/2011 | Kong | H04N 1/00222 | 717/178 |
| 2012/0033258 A1* | 2/2012 | Fukasawa | H04N 1/00413 | 358/1.15 |
| 2013/0286429 A1* | 10/2013 | Goyal | G06F 3/123 | 358/1.15 |
| 2013/0326502 A1* | 12/2013 | Brunsman | G06F 8/61 | 717/178 |
| 2014/0359502 A1* | 12/2014 | Yoon | G06F 3/04817 | 715/766 |
| 2015/0002890 A1* | 1/2015 | Okuno | G06F 3/1294 | 358/1.15 |
| 2015/0095902 A1* | 4/2015 | Boss | G06F 8/61 | 717/174 |
| 2015/0294093 A1* | 10/2015 | Yabe | G06F 21/105 | 726/26 |
| 2015/0358088 A1* | 12/2015 | Eim | H04W 76/14 | 455/418 |
| 2016/0094731 A1* | 3/2016 | Nakamura | H04N 1/00222 | 358/403 |
| 2016/0117072 A1* | 4/2016 | Sharifi | G06F 3/04842 | 715/769 |
| 2016/0274834 A1* | 9/2016 | Fukasawa | G06F 3/1222 | |
| 2016/0291954 A1* | 10/2016 | Boss | G06F 8/61 | |
| 2016/0316085 A1* | 10/2016 | Takahashi | H04N 1/00795 | |
| 2016/0316088 A1* | 10/2016 | Negoro | G06F 9/451 | |
| 2017/0068405 A1* | 3/2017 | Lue-Sang | G06F 3/0482 | |
| 2017/0214781 A1* | 7/2017 | Ichida | H04M 1/6091 | |
| 2017/0244866 A1* | 8/2017 | Kano | G06F 3/1239 | |
| 2017/0337019 A1* | 11/2017 | Ukegawa | G06F 3/1225 | |
| 2018/0046444 A1* | 2/2018 | Boss | G06F 3/0486 | |

\* cited by examiner

WARNING

FOR UNINSTALLATION, RELEVANT PRODUCT IN AVAILABLE
PRODUCTS NEEDS TO BE DOWNLOADED.
PLEASE TRY AGAIN AFTER DOWNLOADING.

CLOSE

INFORMATION PROCESSING APPARATUS, INFORMATION PROCESSING SYSTEM, AND NON-TRANSITORY COMPUTER READABLE MEDIUM

CROSS-REFERENCE TO RELATED APPLICATIONS

This application is based on and claims priority under 35 USC 119 from Japanese Patent Application No. 2016-198020 filed Oct. 6, 2016.

BACKGROUND

Technical Field

The present invention relates to information processing apparatuses, information processing systems, and non-transitory computer readable media.

SUMMARY

According to an aspect of the invention, there is provided an information processing apparatus connected to a device and a server via a network and including a first acquiring unit, a second acquiring unit, and a display controller. The first acquiring unit acquires information related to the device from the device. The second acquiring unit acquires information about application software from the server. The display controller performs control so as to display image information expressing the device, the information about which is acquired by the first acquiring unit, and image information expressing the application software, the information about which is acquired by the second acquiring unit, in a form of a list. The display controller performs control such that a display mode of at least one of the image information expressing the device and the image information expressing the application software is varied between a case where the application software is installable into the device and a case where the application software is not installable into the device.

BRIEF DESCRIPTION OF THE DRAWINGS

An exemplary embodiment of the present invention will be described in detail based on the following figures, wherein.

DETAILED DESCRIPTION

An exemplary embodiment of the present invention will be described in detail below with reference to the drawings.

Figure 1:
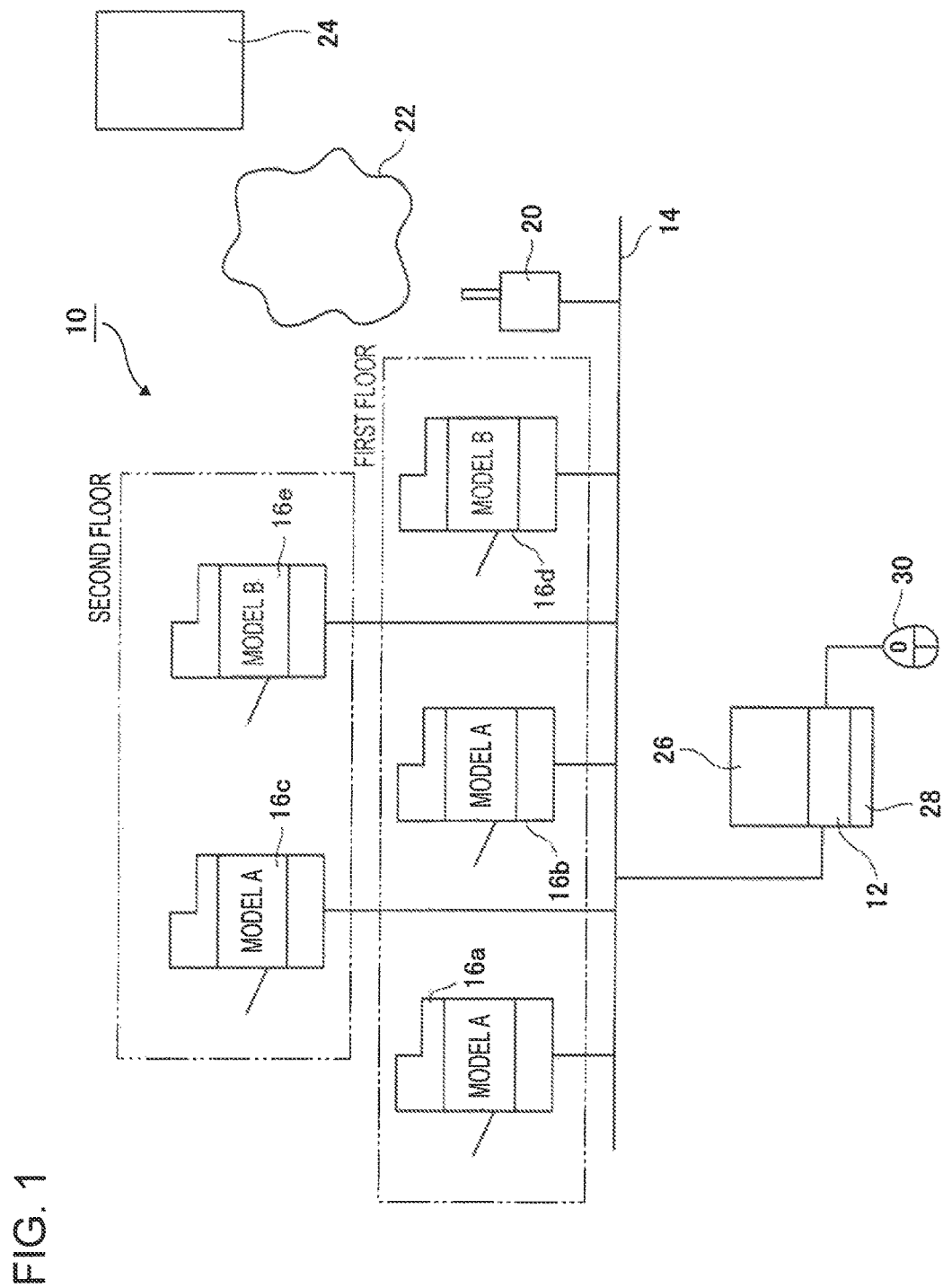
FIG. 1 is a system configuration diagram illustrating the configuration of an information processing system according to an exemplary embodiment of the present invention.

FIG. 1 is a system diagram illustrating the configuration of an information processing system according to an exemplary embodiment of the present invention.

An information processing system 10 according to an exemplary embodiment of the present invention has, for example, an information processing apparatus 12 constituted of a personal computer. The information processing apparatus 12 is connected to devices 16a to 16e via a wireless or wired local area network (LAN) 14. The devices 16a to 16e are, for example, image forming devices having multiple functions, such as copying, printing, scanning, and facsimile functions.

The devices 16a to 16c are of model A and are given device names A-1, A-2, and A-3, respectively. The devices 16d and 16e are of model B and are given device names B-1 and B2, respectively. The devices 16a, 16b, and 16d are disposed on the first floor, and the devices 16c and 16e are disposed on the second floor.

The LAN 14 is provided with a router 20 that is network-connected to an external server 24 via the Internet 22.

The information processing apparatus 12 is connected to, for example, a display 26, a keyboard 28, and a mouse 30.

Figure 2:
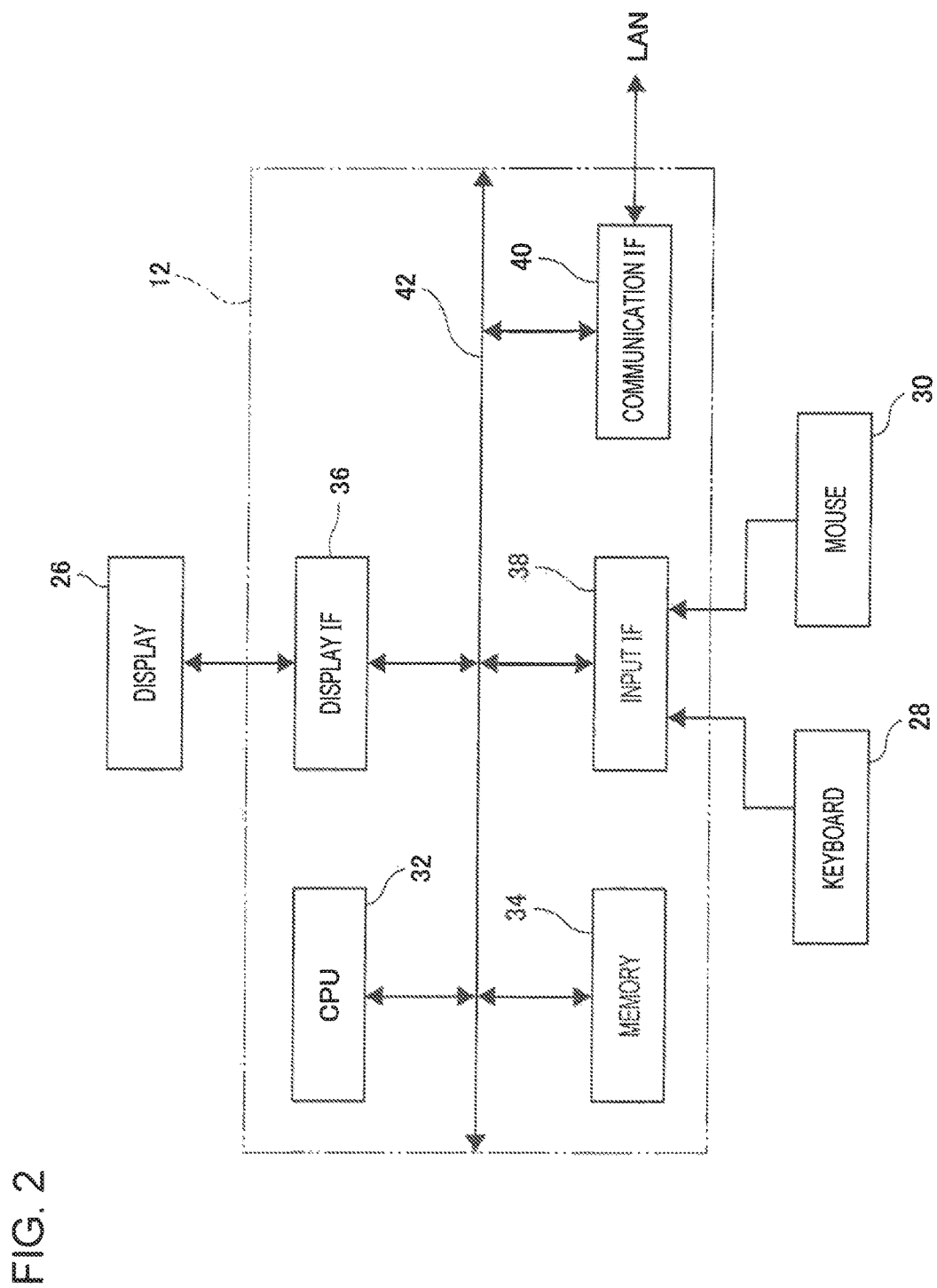
FIG. 2 is a block diagram illustrating the hardware configuration of an information processing apparatus according to an exemplary embodiment of the present invention.

FIG. 2 is a block diagram illustrating a control section of the information processing apparatus 12.

The information processing apparatus 12 has a central processing unit (CPU) 32, a memory 34, a display interface 36, an input interface 38, and a communication interface 40, which are connected to one another via a control bus 42.

The CPU 32 executes a predetermined process based on a control program stored in the memory 34. The display interface 36 is connected to the display 26. In a case where the display 26 has a touchscreen, the display interface 36 receives operational data from the touchscreen. The input interface 38 is connected to the keyboard 28 and the mouse 30 and receives operational data from the keyboard 28 and the mouse 30. The communication interface 40 is connected to the aforementioned LAN 14 and receives and outputs data via the LAN 14.

Figure 3:
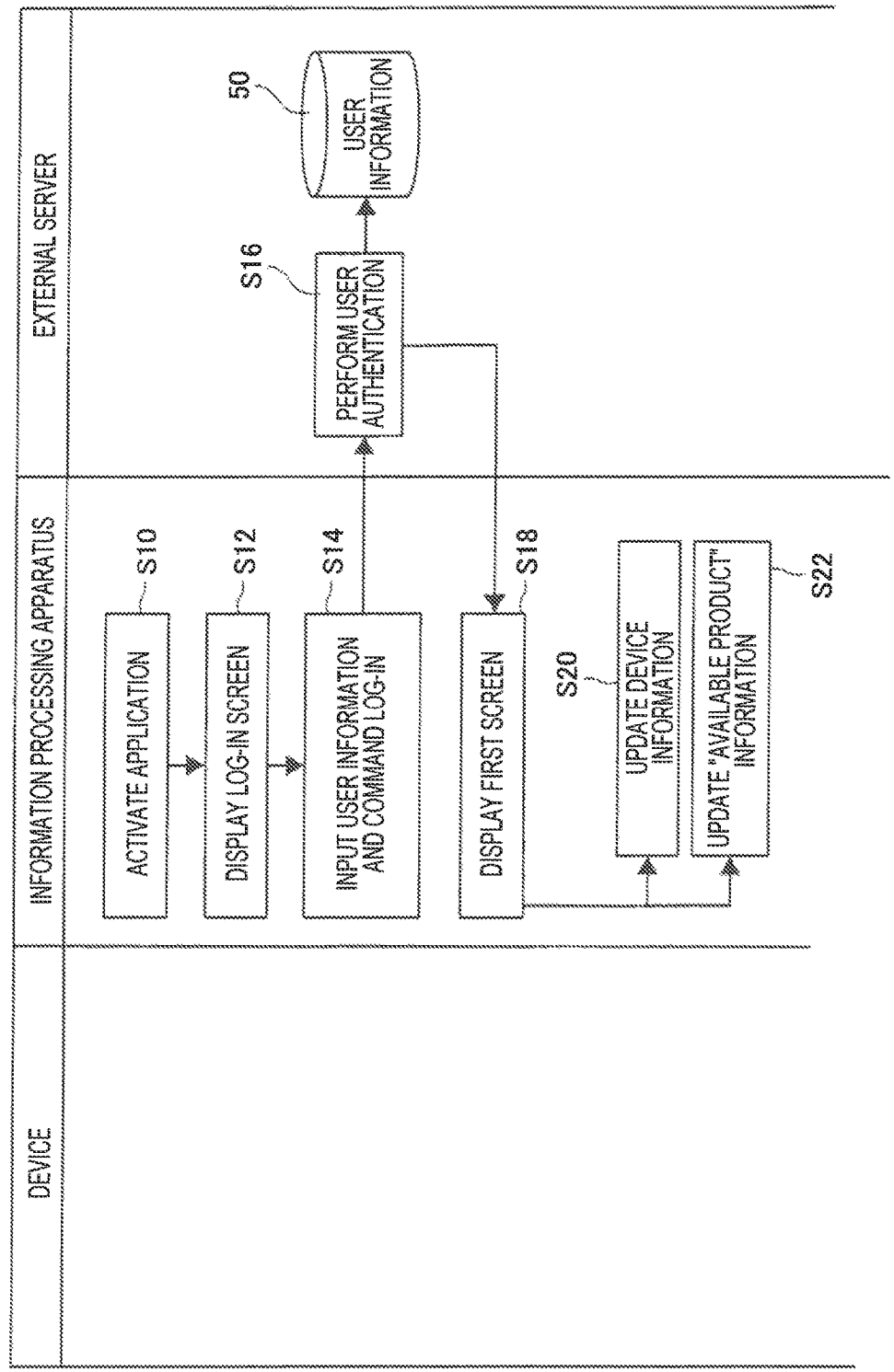
FIG. 3 is a sequence diagram illustrating a control flow when logging into the information processing system according to the exemplary embodiment of the present invention.

FIG. 3 is a sequence diagram when logging into the information processing system 10 according to the exemplary embodiment of the present invention.

Figure 6:
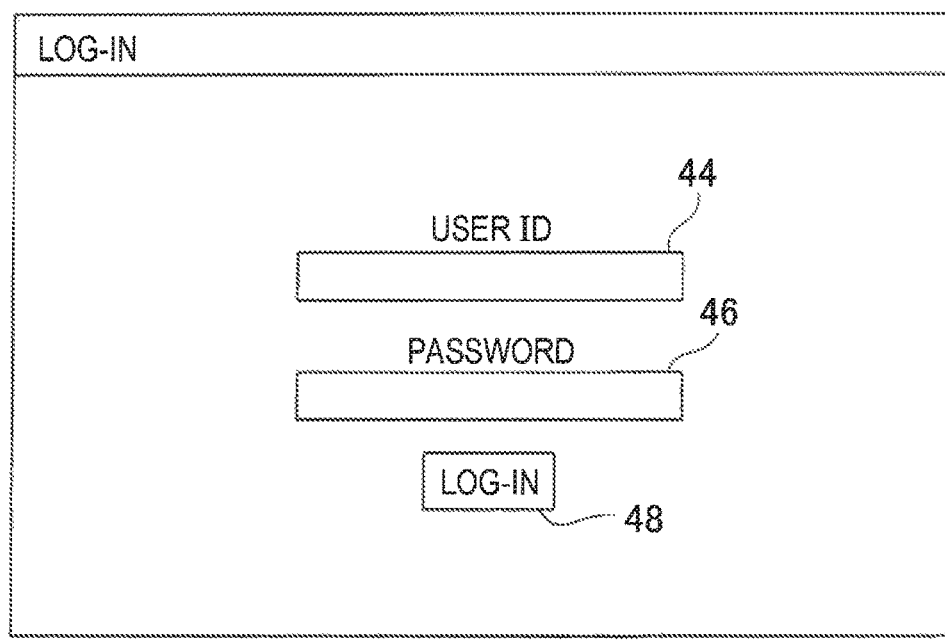
FIG. 6 is a screen diagram illustrating a log-in screen according to the exemplary embodiment of the present invention.

First, when application software of the information processing apparatus 12 is activated in step S10, the information processing apparatus 12 displays a log-in screen in step S12. For example, as shown in FIG. 6, the log-in screen has a user ID input section 44 and a password input section 46. In step S14, when a user ID is input to the user ID input section 44, a password is input to the password input section 46, and a log-in button 48 shown in FIG. 6 is pressed, user information and log-in command information are transmitted to the external server 24. In step S16, the external server 24 executes a user authentication process by comparing the received user information with user information preregistered in a user information database 50. If a successful result is obtained, information indicating that the successful result is obtained is transmitted to the information processing apparatus 12. In step S18, the information processing apparatus 12 displays a first screen.

Figure 7:
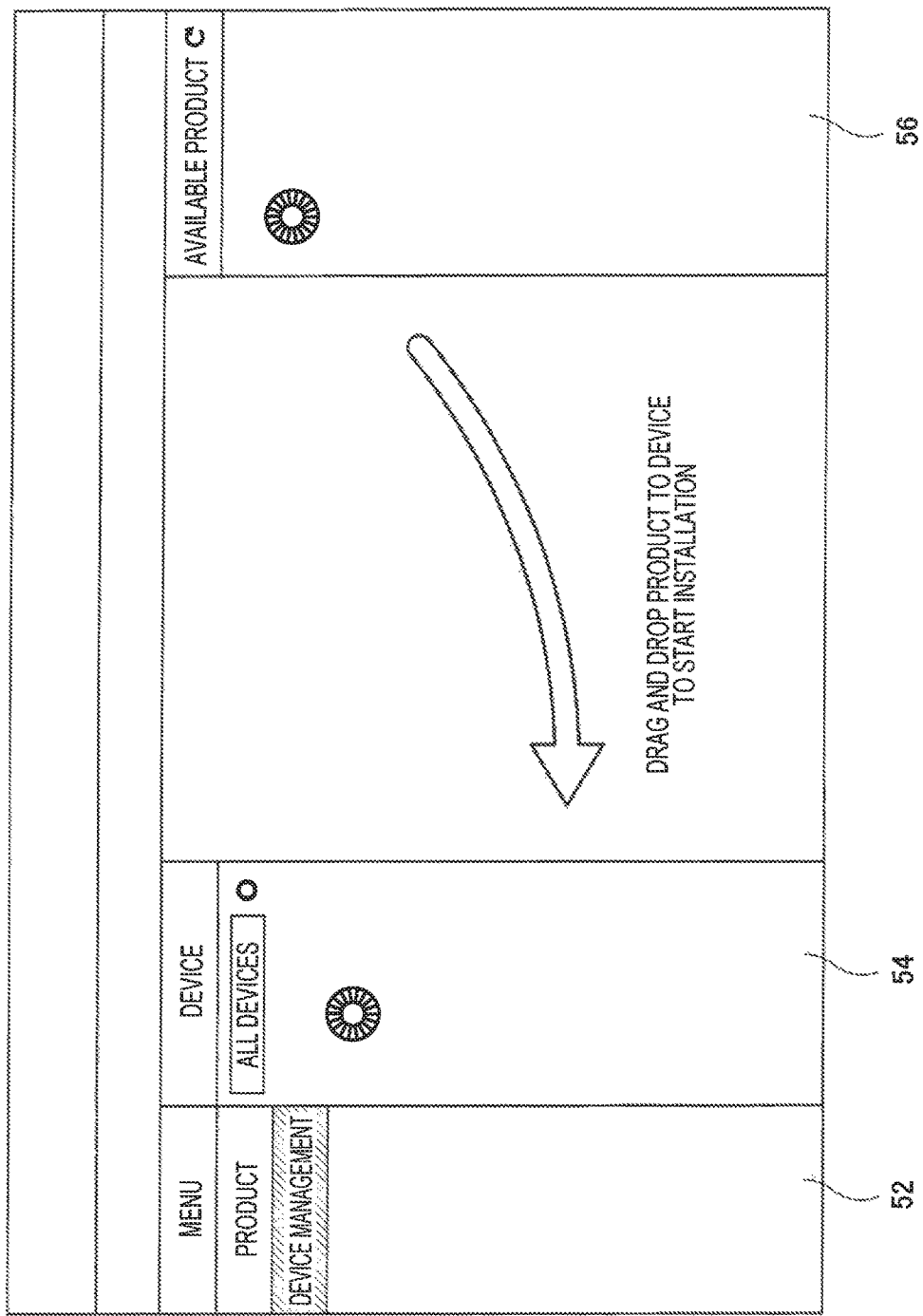
FIG. 7 is a screen diagram illustrating an initial display state of a first screen according to the exemplary embodiment of the present invention.

As shown in FIG. 7, the first screen has a menu display section 52, a device display section 54, and an application software display section 56.

In order to form the first screen in step S18, device information is updated in step S20 and available product information is updated in step S22.

Figure 4:
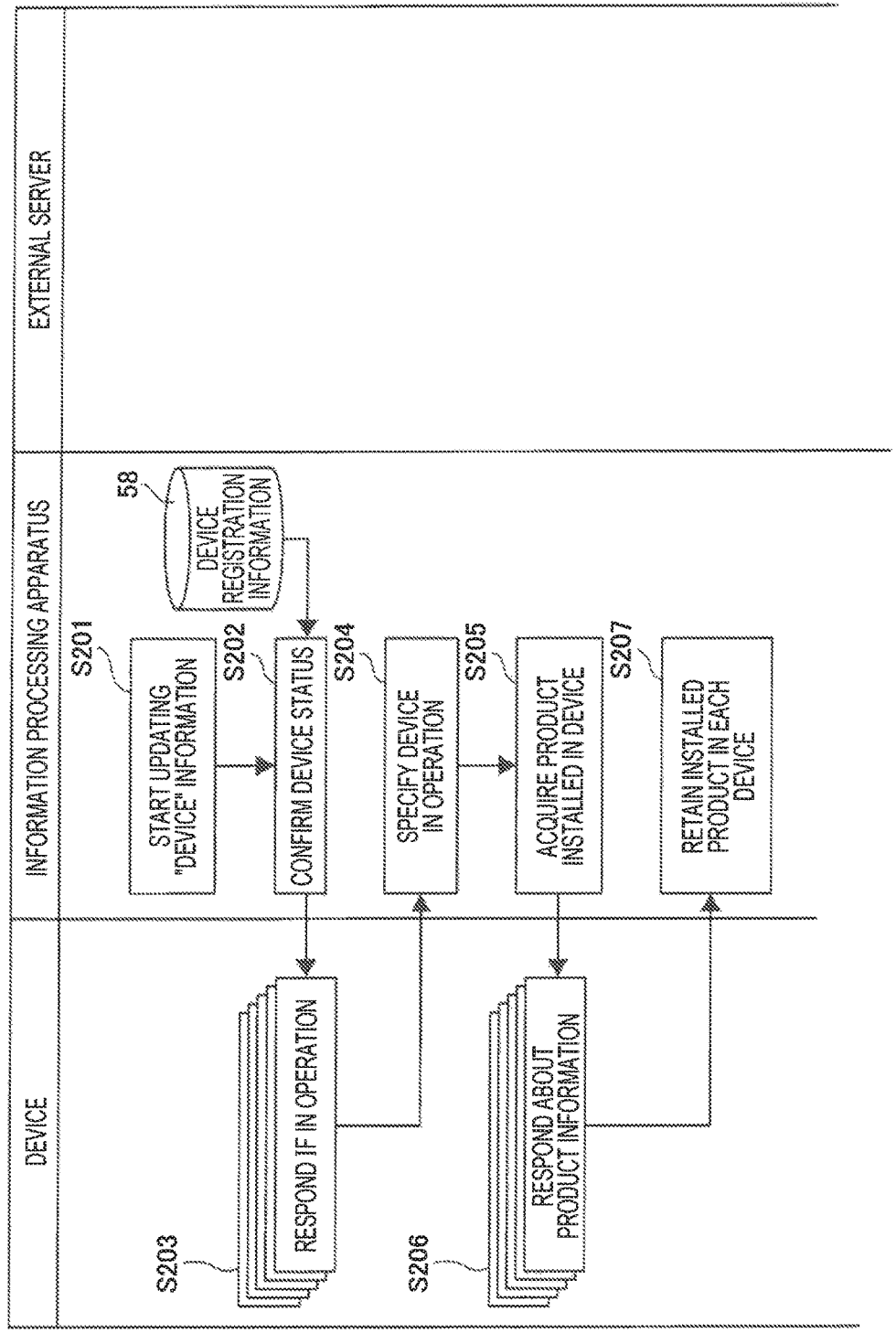
FIG. 4 is a sequence diagram illustrating a device-information updating step in detail, in accordance with the exemplary embodiment of the present invention.

FIG. 4 illustrates the device-information updating step S20 in detail.

In step S201, the device-information updating process commences. In step S202, device information preregistered in a device-registration-information storage unit 58 provided within the aforementioned memory 34 is read, and the device status is confirmed based on the read device information. The device-registration-information storage unit 58 has registered therein, for example, the device IP address, the device name, the device type, the installation location, and the administrator's name. In step S202, confirmation information is output to a registered device based on registered device information. When the device receives the confirmation information, the device determines whether or not the device is in operation in step S203. If in operation, the device transmits in-operation information to the information processing apparatus 12.

In step S204, the information processing apparatus 12 receives the in-operation information from the device so as to specify the device that is in operation. In step S205, the device specified in step S204 is commanded to acquire information about application software (referred to as "App" hereinafter) installed in the device.

In step S206, the device determines the installed App and transmits the determination result to the information processing apparatus 12. In step S207, the information processing apparatus 12 retains the information about the App installed in each device.

Figure 5:
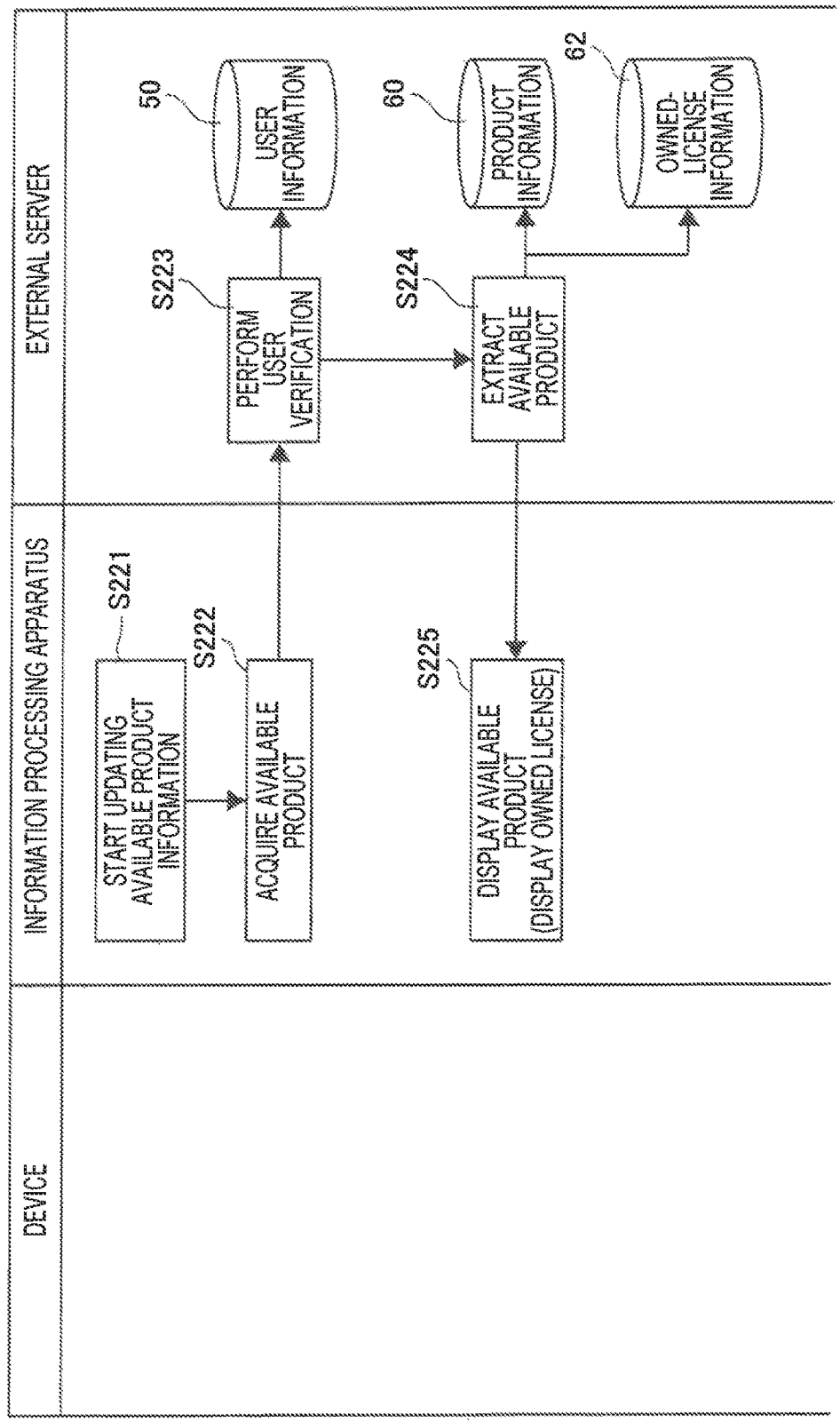
FIG. 5 is a sequence diagram illustrating a product-information updating step in detail, in accordance with the exemplary embodiment of the present invention.

FIG. 5 illustrates the product-information updating step S22 in detail.

In step S221, the available-product information updating process commences. In step S222, a request is made to the external server 24 so that available product information is acquired therefrom. In step S223, the external server 24 executes a user verification process by comparing requested user information with user information registered in the user information database 50. In step S224, an available product is extracted based on a product information database 60 and an owned-license information database 62, and the extracted product information is transmitted to the information processing apparatus 12. In step S225, the information processing apparatus 12 displays the available product together with license information.

Figure 8:
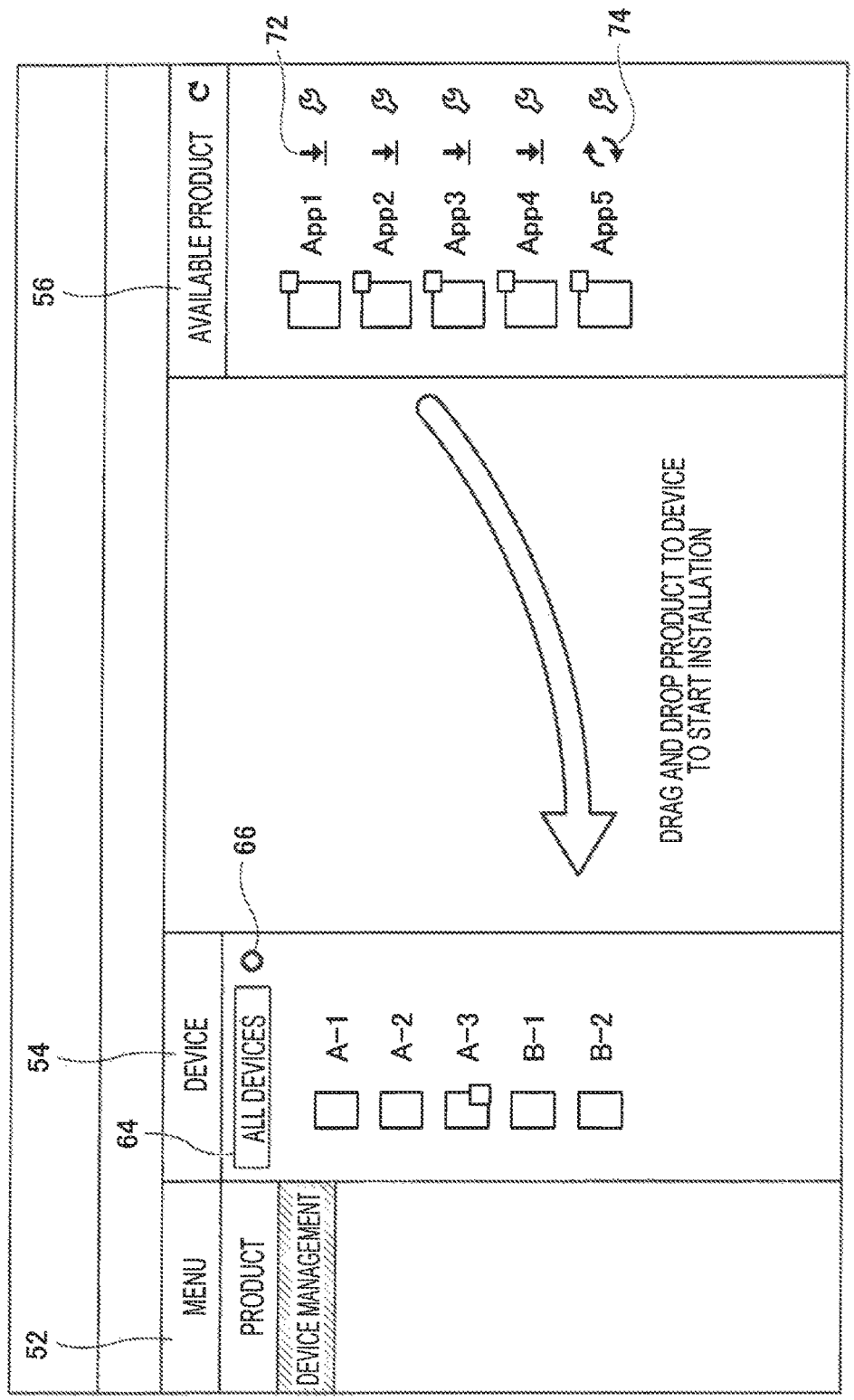
FIG. 8 is a screen diagram illustrating the first screen according to the exemplary embodiment of the present invention.

FIG. 8 illustrates an example where the device information and the available product information are updated in step S20 and step S22.

The device display section 54 has an option display section 64. A select button 66 is displayed next to the option display section 64. Since the option "all devices" is selected in this case, the device display section 54 displays A-1 to A-3 and B-1 and B-2.

Furthermore, the application software display section 56 displays, for example, five available application software programs App 1 to App 5.

Figure 9:
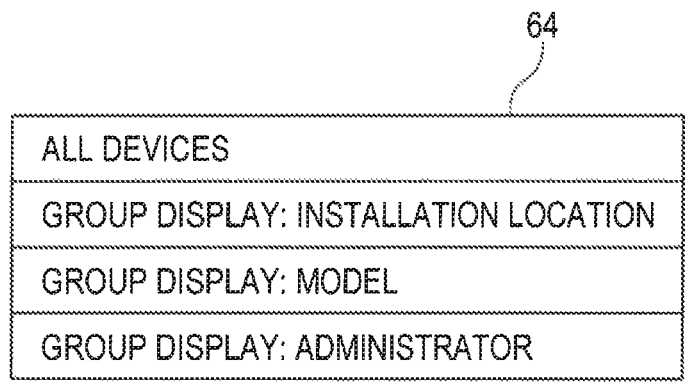
FIG. 9 is a screen diagram illustrating an option display section according to the exemplary embodiment of the present invention.

When the aforementioned select button 66 is clicked, the option display section 64 displays, for example, "all devices", "group display: installation location", "group display: model", and "group display: administrator" as options, as shown in FIG. 9, such that one of these options is selectable in the option display section 64.

Figure 10:
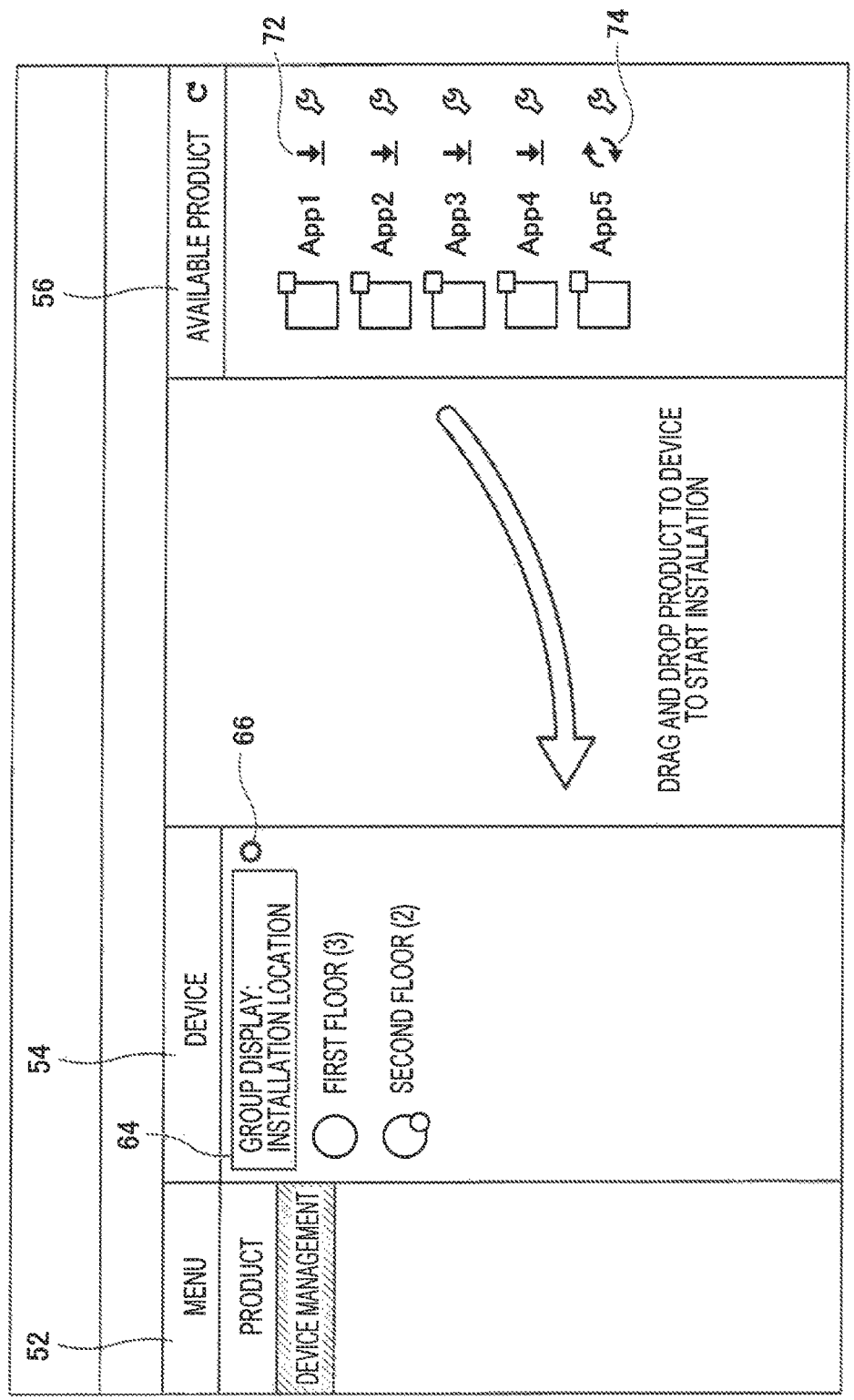
FIG. 10 is a screen diagram illustrating a case where the option display section is set to the option "installation location", in accordance with the exemplary embodiment of the present invention.
Figure 11:
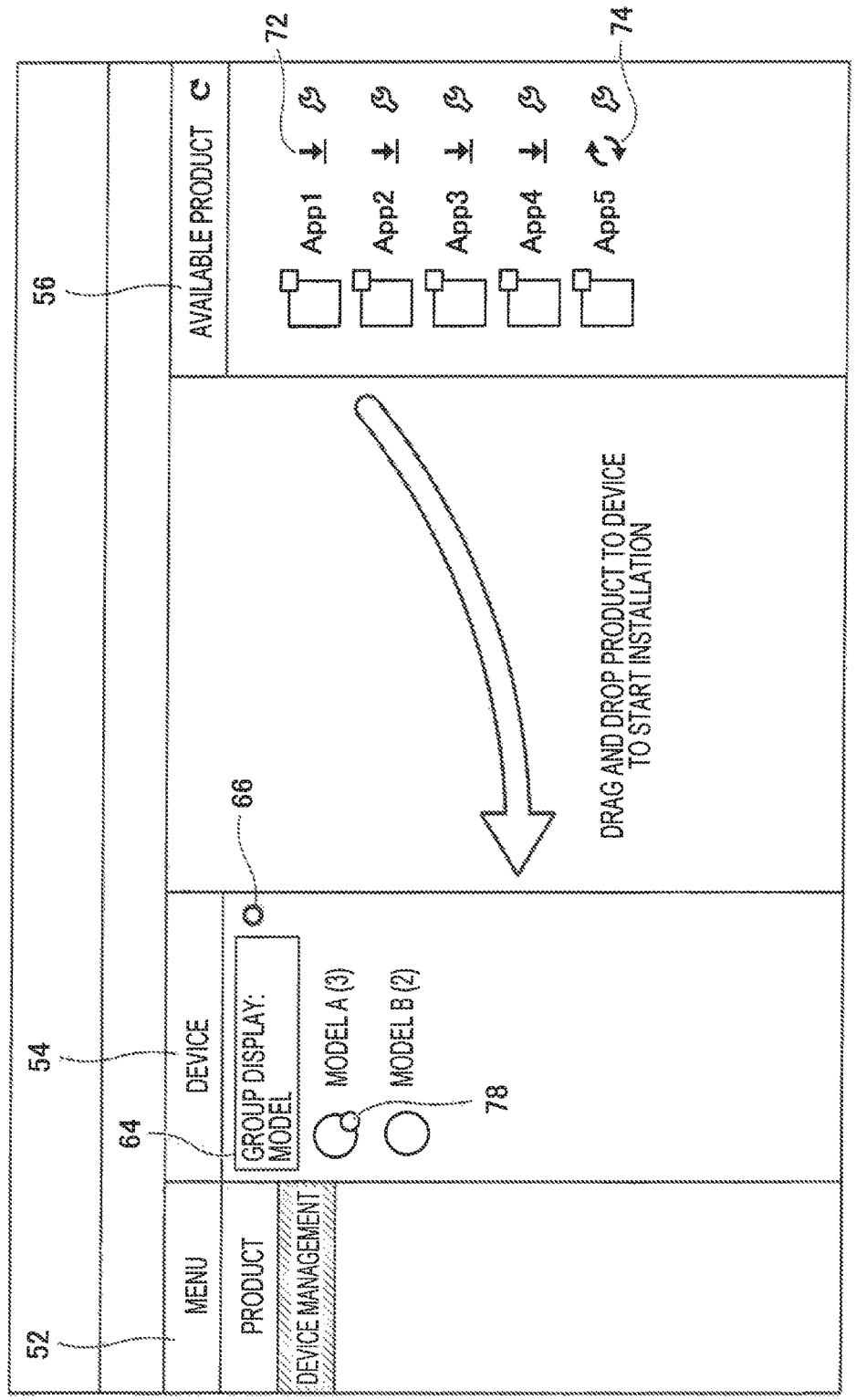
FIG. 11 is a screen diagram illustrating a case where the option display section is set to the option "model", in accordance with the exemplary embodiment of the present invention.

For example, in a case where the option "group display: installation location" is selected, the installation locations are searched, and "first floor (3)" and "second floor (2)" are displayed in the device display section 54, as shown in FIG. 10. The numerical value in the parentheses indicates the number of devices. In a case where the option "group display: model" is selected, "model A (3)" and "model B (2)" are displayed in the device display section 54, as shown in FIG. 11. Similar to the installation locations, the numerical value in the parentheses indicates the number of devices. Likewise, a case where the option "group display: administrator" is selected corresponds to the administrator.

Figure 12:
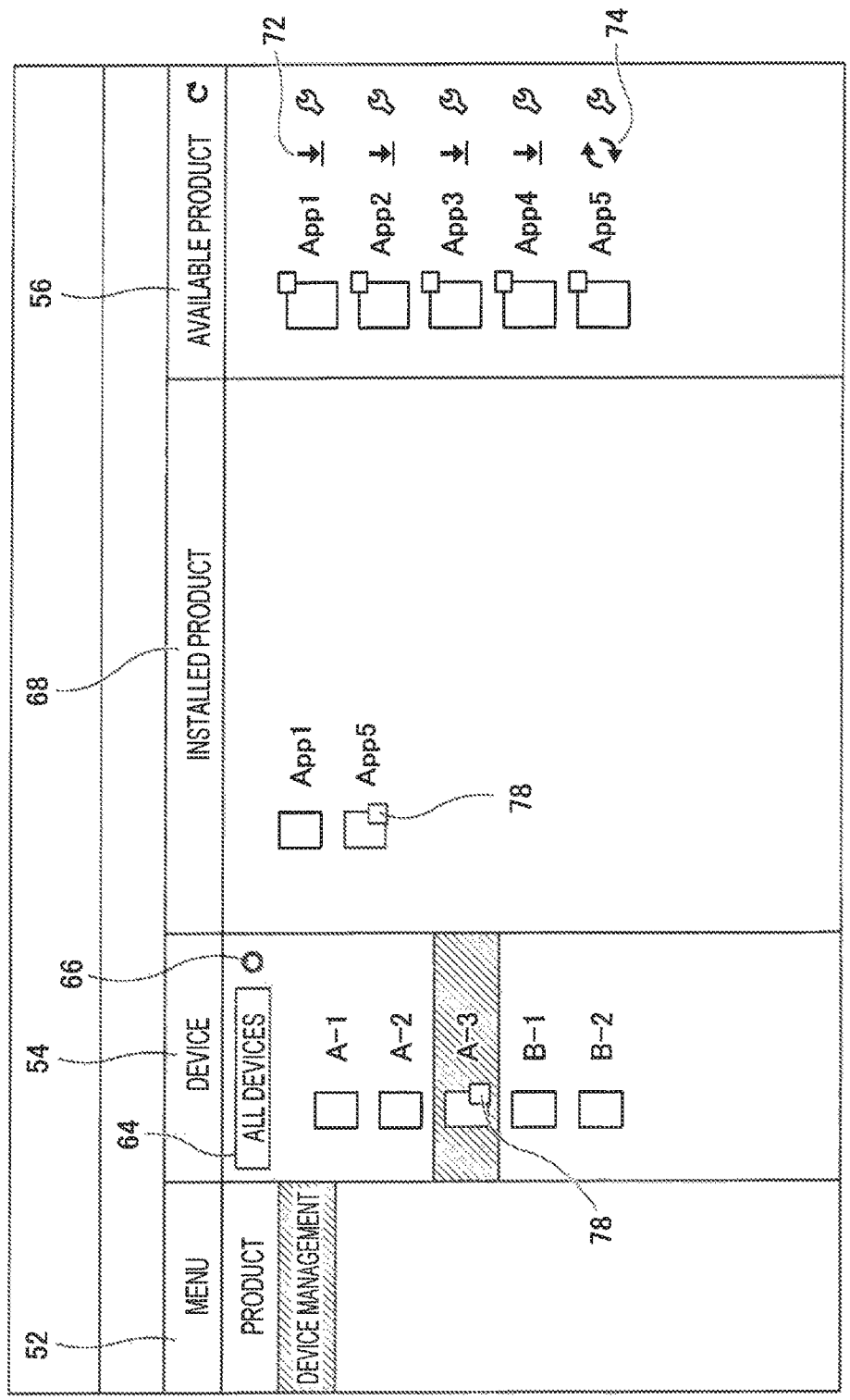
FIG. 12 is a screen diagram having an installed-product display section in a case where the option display section is set to the option "all devices", in accordance with the exemplary embodiment of the present invention.

In a case where the option "all devices" is selected, for example, when the device A-3 is clicked and activated, as shown in FIG. 12, an installed-product display section 68 is newly formed, and products retained in step S207 and already installed in the device A-3, such as App 1 and App 5, are displayed in the installed-product display section 68.

Although it is desirable that the application software information and the device information be confirmable at one time, as shown in FIG. 8, the two pieces of information may be displayed in a different mode.

Figure 13:
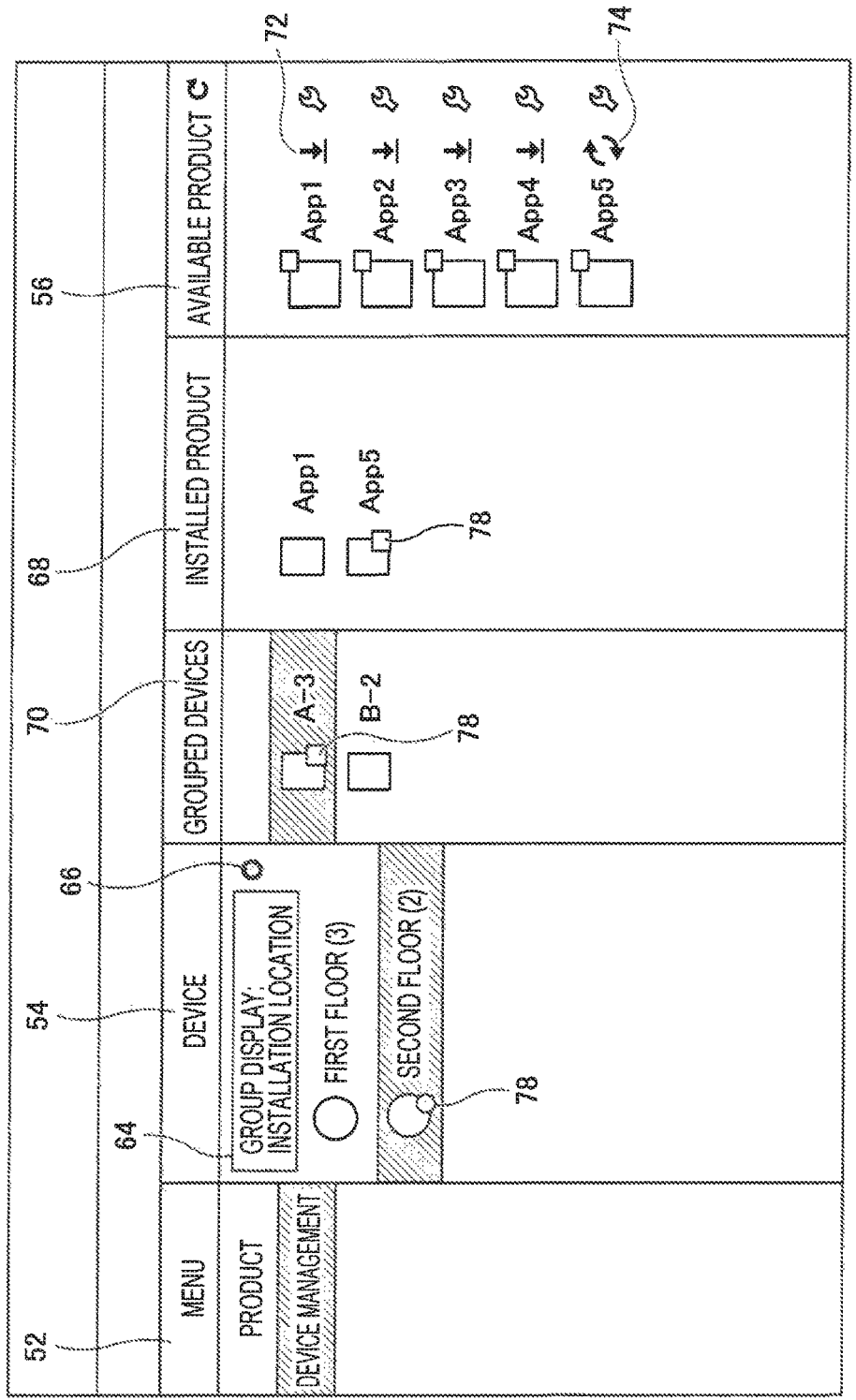
FIG. 13 is a screen diagram having the installed-product display section in a case where the option display section is set to the option "installation location", in accordance with the exemplary embodiment of the present invention.

Furthermore, in a case where the option "group display: installation location" is selected, for example, when the second floor is activated, as shown in FIG. 13, a group-device display section 70 is newly formed, and the devices A-3 and B-2 belonging to the second floor are displayed in the group-device display section 70. Moreover, when the device A-3 is clicked and activated, the installed-product display section 68 is newly formed, and products retained in step S207 and already installed in the device A-3, such as App 1 and App 5, are displayed in the installed-product display section 68.

Figure 14:
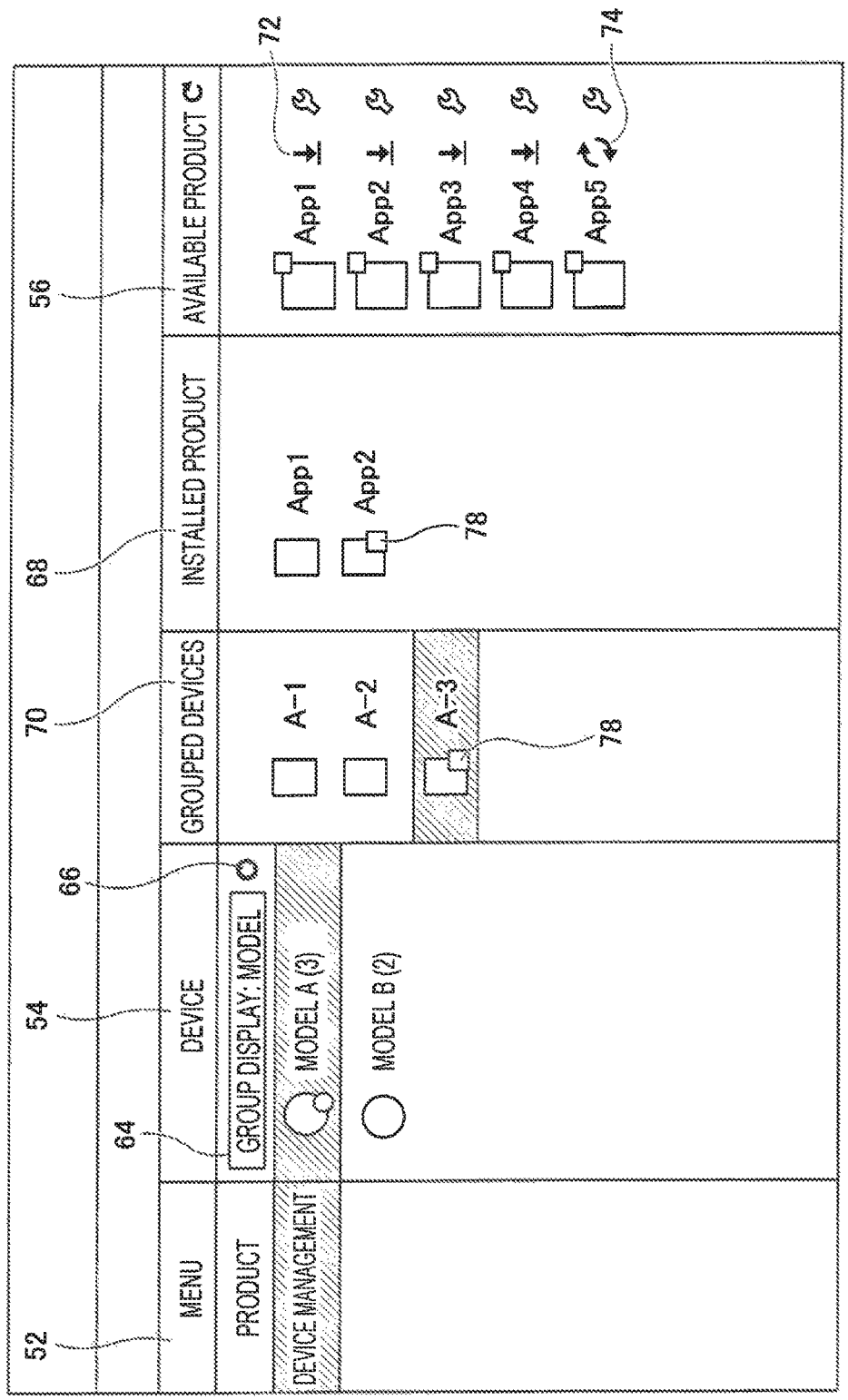
FIG. 14 is a screen diagram having the installed-product display section in a case where the option display section is set to the option "model", in accordance with the exemplary embodiment of the present invention.

Furthermore, in a case where the option "group display: model" is selected, for example, when the model A is activated, as shown in FIG. 14, the group-device display section 70 is newly formed, and the devices A-1, A-2, and A-3 that are of model A are displayed in the group-device display section 70. Moreover, when the device A-3 is clicked and activated, the installed-product display section 68 is newly formed, and products retained in step S207 and already installed in the device A-3, such as App 1 and App 5, are displayed in the installed-product display section 68.

Figure 15:
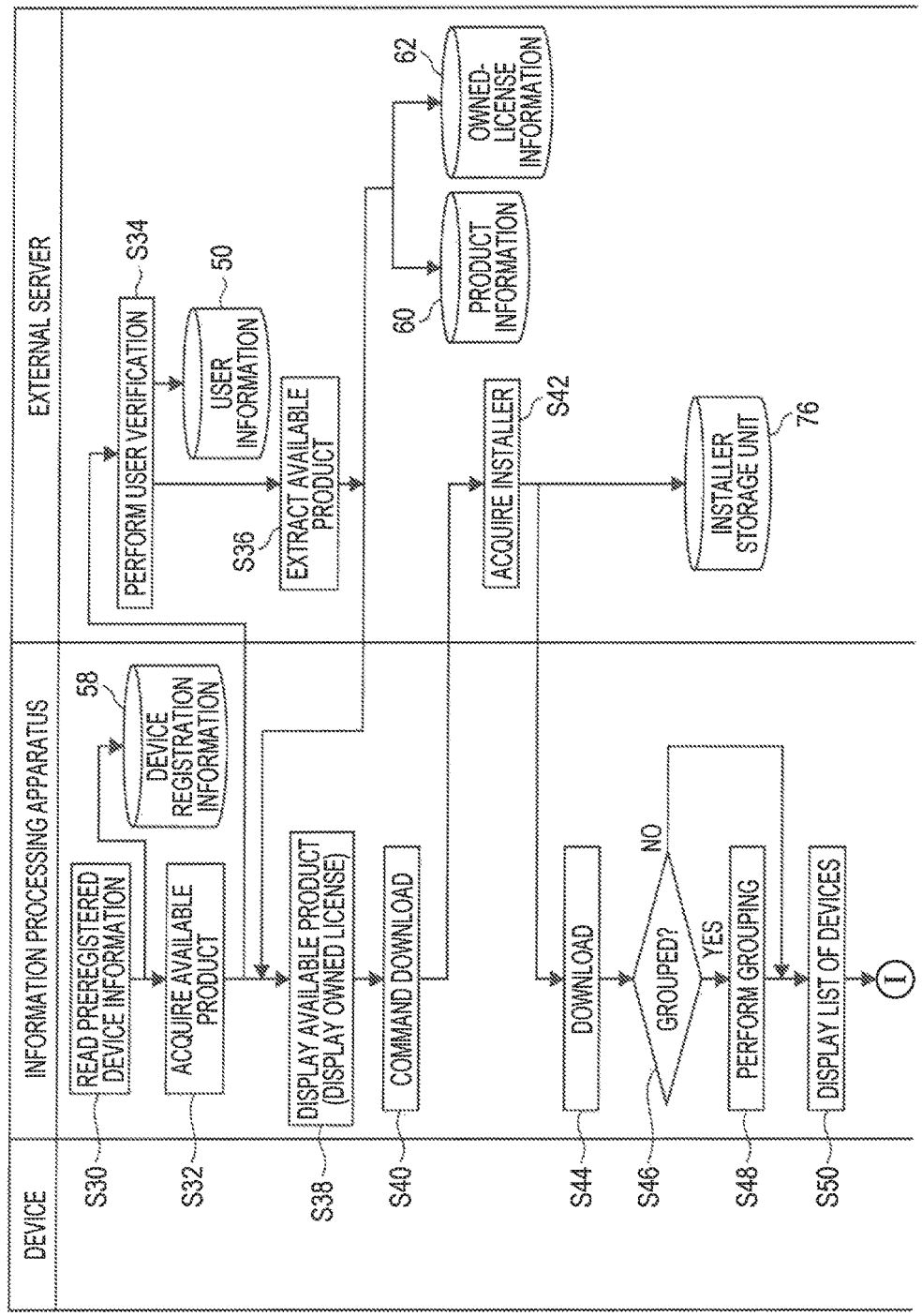
FIG. 15 is a sequence diagram illustrating the first half of a control flow during an installation process in the information processing system according to the exemplary embodiment of the present invention.
Figure 16:
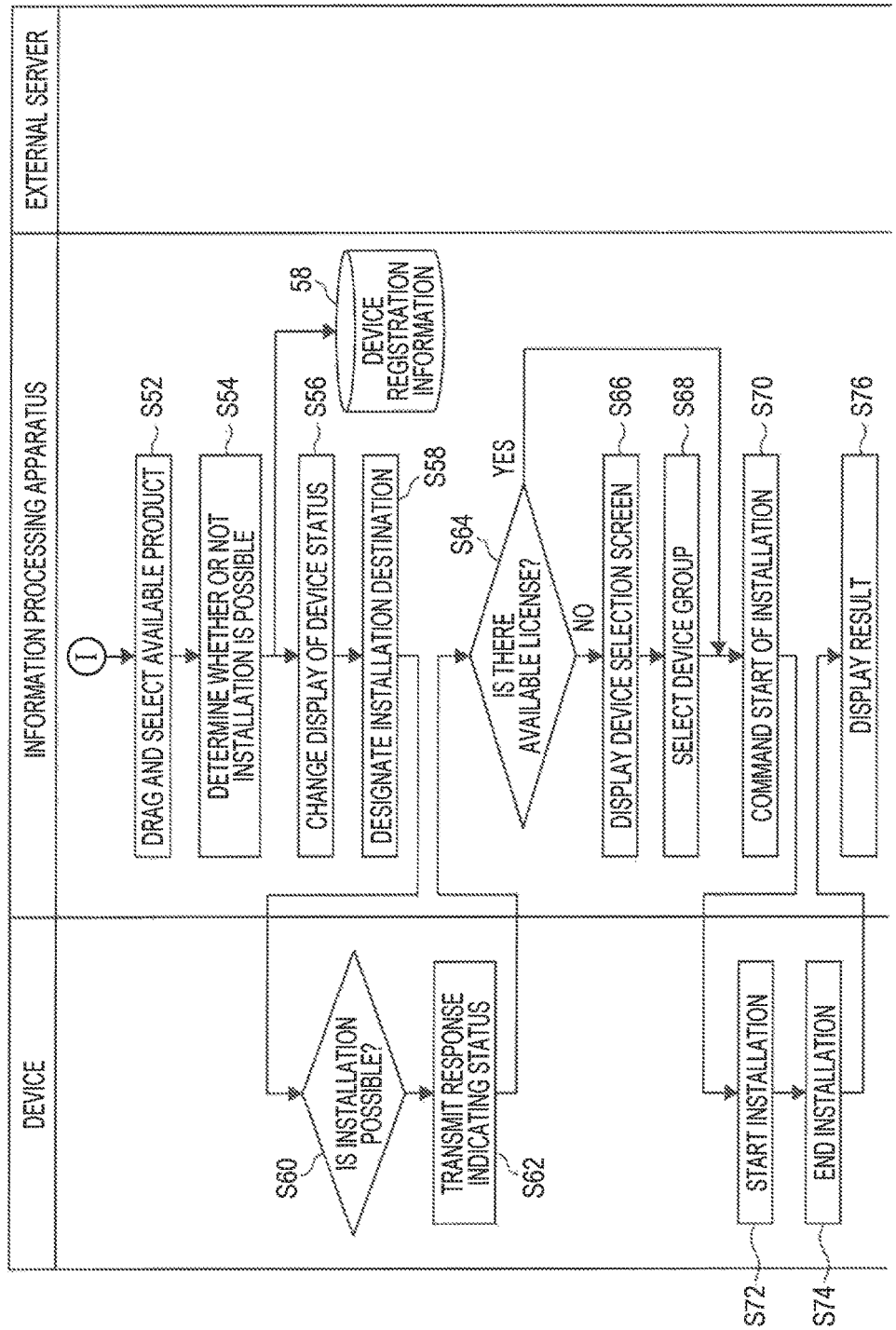
FIG. 16 is a sequence diagram illustrating the second half of the control flow during the installation process in the information processing system according to the exemplary embodiment of the present invention.

FIGS. 15 and 16 are sequence diagrams illustrating a case where an App is to be installed or updated in a device in the information processing system 10 according to the exemplary embodiment of the present invention.

In step S30, device information preregistered in the device-registration-information storage unit 58 is read, and the process proceeds to step S32. In step S32, a request is made to the external server 24 so that available product information is acquired therefrom. In step S34, the external server 24 executes a user verification process by comparing requested user information with user information registered in the user information database 50. In step S36, an available product is extracted based on the product information database 60 and the owned-license information database 62, and the extracted product information is transmitted to the information processing apparatus 12. In step S38, the information processing apparatus 12 displays the available product together with license information, as shown in FIG. 8.

In FIG. 8, a download command icon 72 for receiving a download command or an update command icon 74 for receiving an update command is displayed next to each available-product icon.

Figure 17:
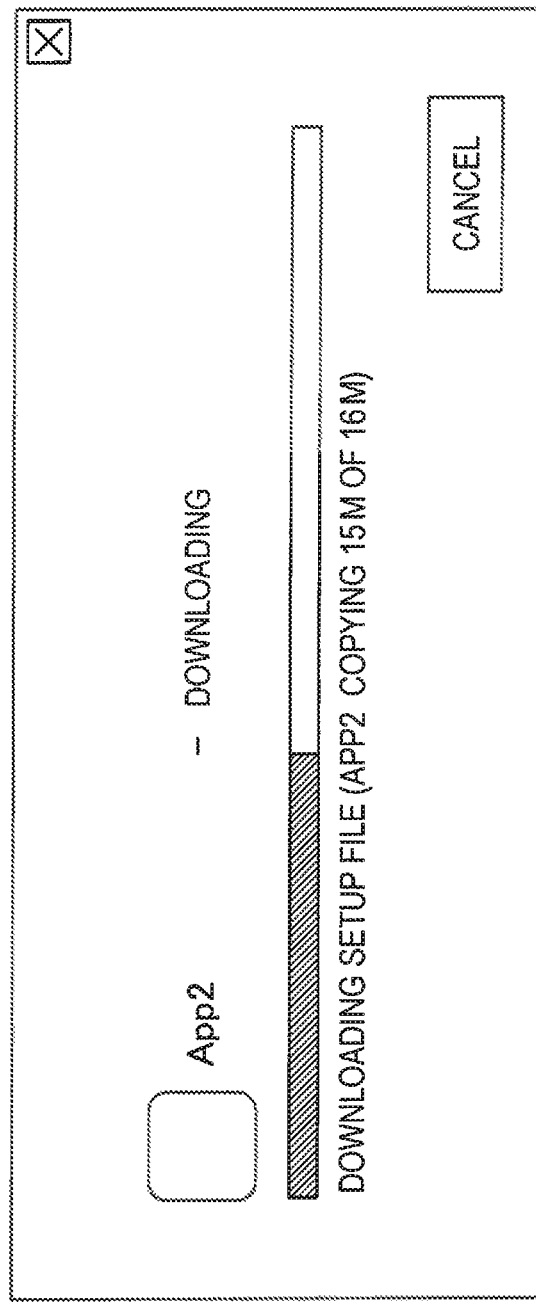
FIG. 17 is a screen diagram illustrating a screen during a downloading process, in accordance with the exemplary embodiment of the present invention.
Figure 18:
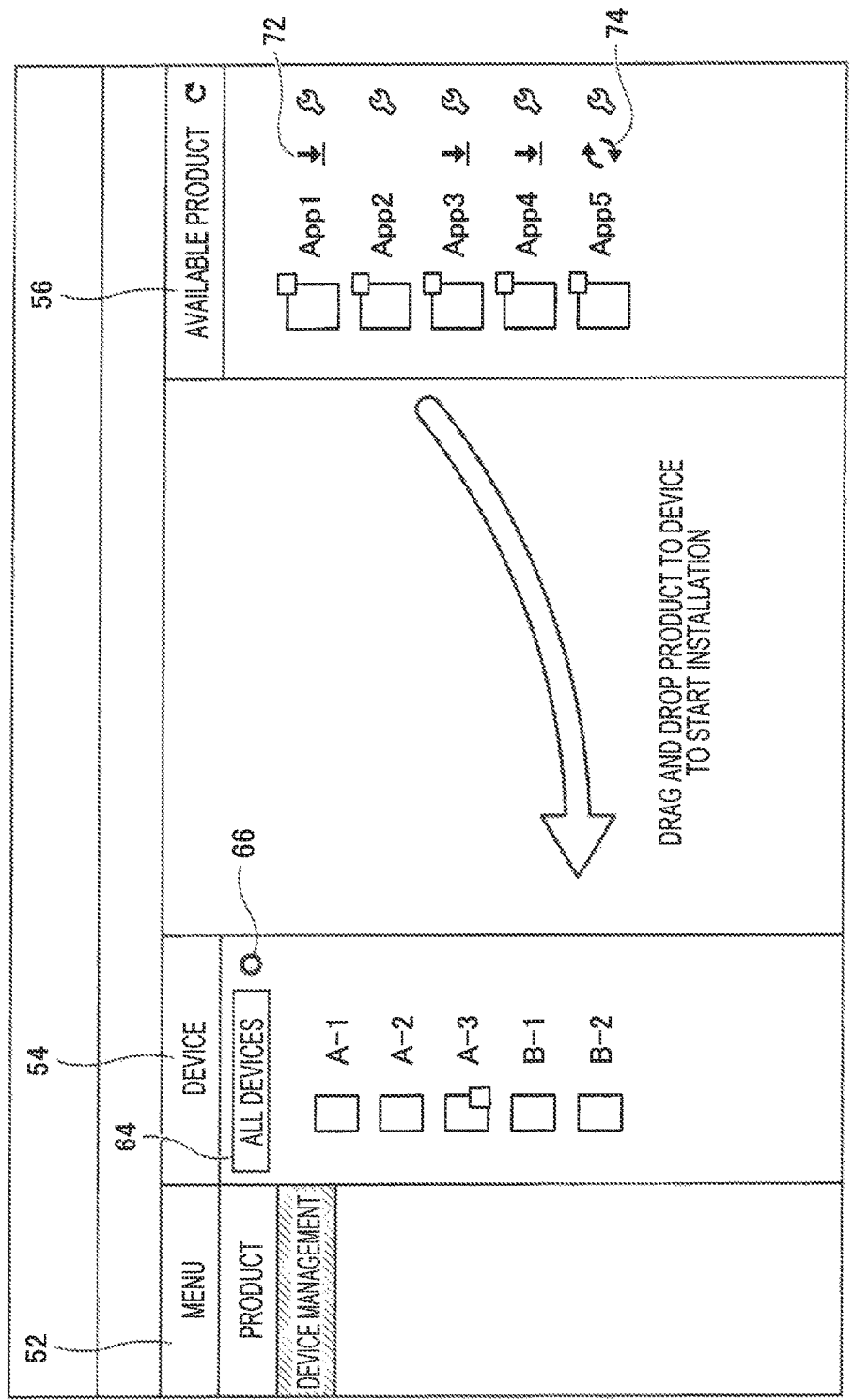
FIG. 18 is a screen diagram illustrating the first screen after the downloading process, in accordance with the exemplary embodiment of the present invention.

In step S40, when the download command icon 72 or the update command icon 74 is clicked, download command information or update command information is transmitted to the external server 24. When the external server 24 receives the download command information or the update command information, the external server 24 reads a designated installer or updater from an installer storage unit 76 in step S42 and transmits the read installer or updater to the information processing apparatus 12, so that a downloading process is performed in step S44. During this downloading process, the information processing apparatus 12 also acquires model information supported by each App being downloaded. The acquired support information is registered for each model into the device-registration-information storage unit 58. Furthermore, the downloading process also involves displaying which App is being downloaded, as shown in FIG. 17. For example, when App 2 is downloaded, the download command icon 72 of App 2 disappears, as shown in FIG. 18. The same applies to the case of the updating process.

If there is an updatable App in the device display section 54, an update sign 78 that indicates that the App is updatable is displayed on a device icon and an installed icon, as shown in FIGS. 11, 12, and 13.

In step S46, it is determined whether or not the devices are grouped. If it is determined in step S46 that the devices are not grouped (i.e., if all devices are selected, as shown in FIG. 8), the process proceeds to step S50. In contrast, if the devices are grouped, the process proceeds to step S48 where a grouping process is performed by performing a searching process in accordance with which attribute the devices are grouped. Then, the process proceeds to step S50. In step S50, a list of target devices is displayed for each group, as shown in FIGS. 12, 13, and 14.

Figure 19:
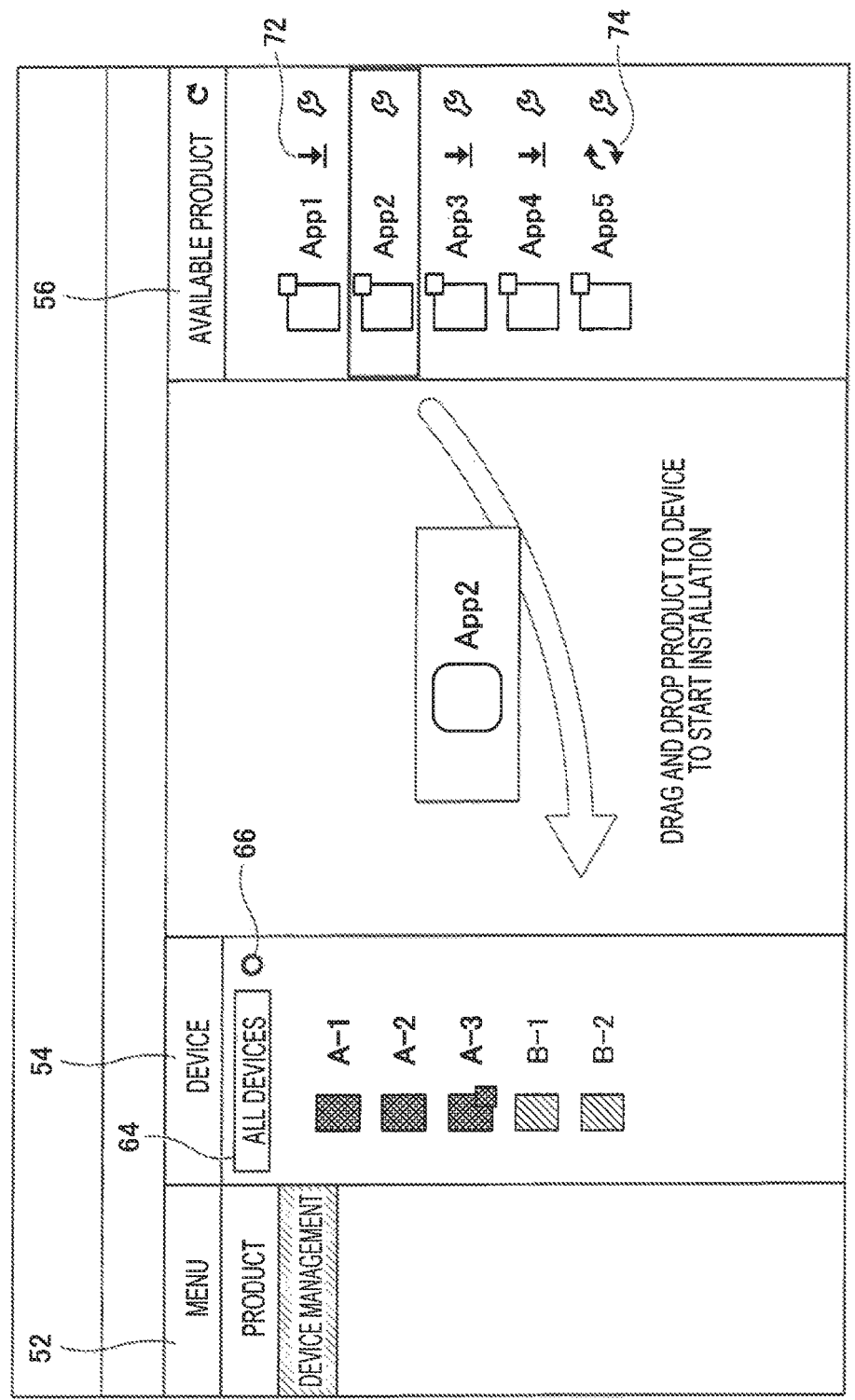
FIG. 19 is a screen diagram illustrating a screen during an installation operation, in accordance with the exemplary embodiment of the present invention.

In step S52, as shown in FIG. 19, an available product, such as App 2, is dragged and selected. In step S54, it is determined whether or not installation is possible based on device registration information stored in the device-registration-information storage unit 58. For example, if it is determined whether or not installation is possible based on support information, it is determined whether or not which model is supported by the selected App by using App support information stored in the device-registration-information storage unit 58. In this exemplary embodiment, App 2 supports model A but does not support model B. Alternatively, it may be determined whether or not installation is possible based on information, such as whether the available product is already installed, whether the available product is a trial version, whether the available product is a fee-based version, and the relationship between the already-installed application and the application to be installed.

In step S56, the display of the device status is changed based on the determination result obtained in step S54 indicating whether or not installation is possible. For example, a device not capable of installing the available product therein is displayed in a grayed-out mode and is not selectable. In this exemplary embodiment, the devices B-1 and B-2 are displayed in a grayed-out mode and are not selectable.

Furthermore, if it is determined that the supported model does not exist in the network, all of the devices may be displayed in a grayed-out mode. Alternatively, the relevant App may be not displayed in the application software display section 56, or the App may be displayed in a non-selectable mode. As another alternative, a message indicating that installation is not possible may be displayed, or installation commands may be not transmitted to the devices. Moreover, if a selected App is already installed in a device, the device may be set in a non-selectable mode or a non-displayed mode, or dropping of the App onto the device may be disabled. If the selected App is a free license version and a fee-based version of the same App is installed in the device, the App may be not installable in the device. Accordingly, in accordance with the relationship between the selected App and the device serving as a candidate for an installation destination, control is performed such that the display of image information expressing the device is varied or the App is not allowed to be dragged and dropped onto the image information, whereby the user may ascertain which device is appropriate as the installation destination for the selected App before inputting an installation command.

In step S58, an installation destination is designated. The installation destination is designated by dropping the App dragged in step S52 to the corresponding group or device.

Specifically, as shown in FIG. 12, if all of the devices are selected such that the option "all devices" is displayed in the option display section 64, the dropping destination includes the devices A-1 to A-3, B-1, and B-2. Alternatively, as shown in FIG. 13, if the installation location is selected such that the option "group display: installation location" is displayed in the option display section 64, the dropping destination may include the first floor or the second floor or may include the devices A-1 to A-3, B-1, and B-2. Furthermore, if the model is selected such that the option "group display: model" is displayed in the option display section 64, as shown in FIG. 14, the dropping destination may include model A or model B or may include the devices A-1 to A-3, B-1, and B-2.

If the devices A-1 to A-3, B-1, and B-2 are selected, the installation destination is designated to each of the devices in a one-by-one fashion. If a group is selected, the installation destination is collectively designated to the devices belonging to the group.

When installation destinations are designated in step S58, information indicating that the installation destinations are designated to the individual devices is transmitted. If a device itself is designated as an installation destination, it is determined in step S60 whether or not installation is possible. Then, in step S62, a response indicating whether or not installation is possible is transmitted to the information processing apparatus 12.

A non-installable status refers to a case where the power of the device is not turned on or the device prioritizes another process, such as a case where a job is being executed or the device is experiencing a failure.

Figure 20:
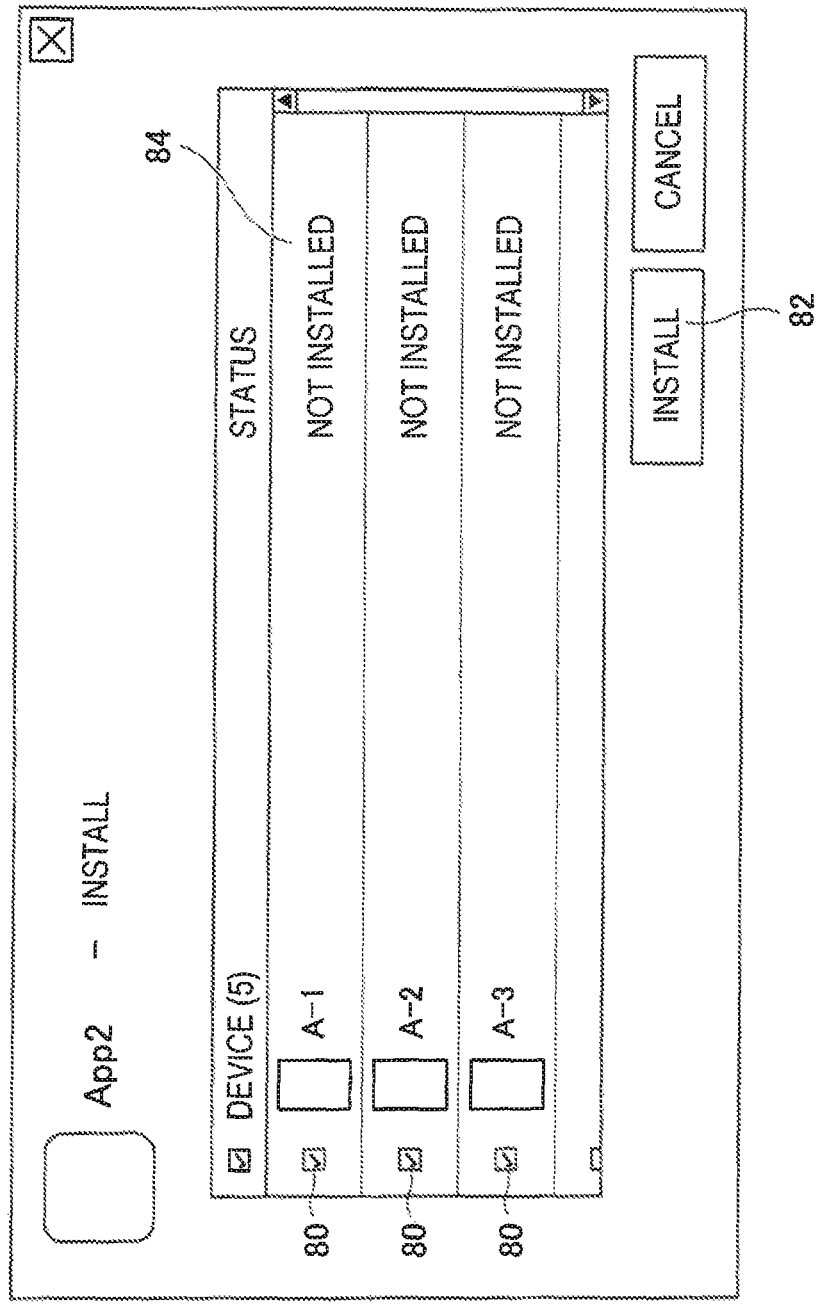
FIG. 20 is a screen diagram illustrating a screen during installation, in accordance with the exemplary embodiment of the present invention.

When the information processing apparatus 12 receives the response from the device, the process proceeds to step S64 where it is determined whether or not there is an available license (i.e., whether or not the license is invalid). If there is an available license (i.e., if there is a valid license) or the product is free, the process proceeds to step S70. In contrast, if it is determined in step S64 that there is no available license (i.e., if the license is invalid), the process proceeds to step S66. In step S66, a device selection screen is displayed. FIG. 20 illustrates the device selection screen. In this case, a checkbox 80 is displayed together with each device, and the device is selected by inputting a check mark to this checkbox 80. If the selected device has an available license, the process proceeds to step S70 by clicking an install button 82. If the number of licenses is insufficient, the number of checkboxes 80 to be checked is adjusted until the sufficient number of licenses is reached.

An alternative method to the drag-and-drop method used for the installation operation involves inputting a check mark to each relevant checkbox 80 and clicking the install button 82 so as to install the App to each checked device, as shown in FIG. 20.

In step S70, each relevant device is commanded to start installing the App. Each device receiving this command starts the installation process in step S72. In step S74, information indicating that the installation is completed is transmitted to the information processing apparatus 12. Upon receiving the information indicating that the installation is completed, the information processing apparatus 12 displays an "installed" status in a status display section 84 shown in FIG. 20. Moreover, the owned-license information database 62 of the external server 24 is notified that the installation is completed. The external server 24 receiving this notification subtracts the number of installed devices from the original number of licenses.

If the information processing apparatus 12 determines that a device has changed from a non-installable status to an installable status by receiving information from the device indicating that the device has changed to the installable status or by obtaining information about the device every predetermined time period (i.e., when a job is completed), the information processing apparatus 12 may make an installation command again.

Although an App downloading process and an App installation process are performed in two stages in the above-described exemplary embodiment, the two processes may be performed in a single operation. Furthermore, although an available product is selected and then dragged and dropped toward the corresponding device in the above-described exemplary embodiment, a device or a group may be selected and then dragged and dropped toward the corresponding App.

There are following types of Apps.

a. Charge-Free Type 1

This type is free to download, there is no limit to the number of devices into which the App is installable, and there is no expiration date for usage.

b. Charge-Free Type 2

This type is free to download and there is no limit to the number of devices into which the App is installable, but there is an expiration date for usage. An App belonging to this charge-free type 2 is, for example, a trial version.

c. Fee-Based Type 1

A serial number is given to each device so that the license is nontransferable between devices.

d. Fee-Based Type 2

Although a serial number is given to each device, the license is transferable between devices.

e. Cloud Type

This type is available to a contracted user and is installable into an unlimited number of devices after the contract.

The aforementioned owned-license information database 62 manages the number of licenses available to users together with the above-mentioned App types.

An App icon displayed in the application software display section 56 indicates the App type and the available number thereof managed by the owned-license information database 62.

Figure 21:
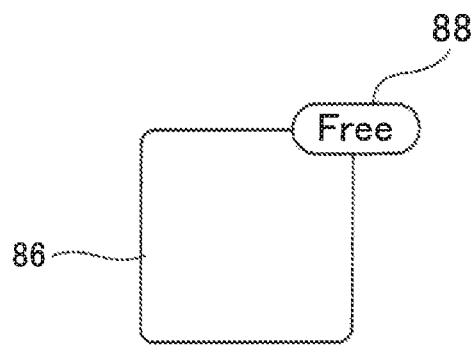
FIG. 21 is a screen diagram illustrating an icon of charge-free application software according to the exemplary embodiment of the present invention.
Figure 22:
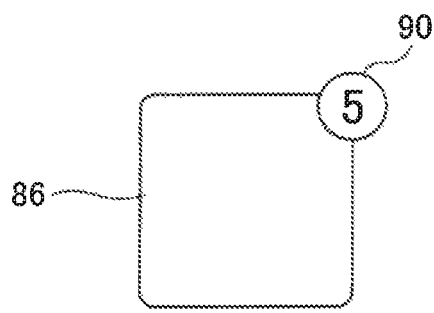
FIG. 22 is a screen diagram illustrating an icon of application software having licenses, such as fee-based application software, in accordance with the exemplary embodiment of the present invention.

Specifically, as shown in FIG. 21, in the case of the charge-free types 1 and 2, a "Free" sign 88 is displayed on an App icon 86. However, in the case of the charge-free type 2, the "Free" sign 88 is deleted from the application software display section 56 after the expiration date. Furthermore, as shown in FIG. 22, in the case of the fee-based types 1 and 2, a number sign 90 is displayed on the App icon 86.

For example, in the case where the App is of the cloud type, the App itself may sometimes be preinstalled in each device. In this case, the installed-product display section 68 displays the App but also displays a message prompting the user to sign a contract. In this case, the App is not displayed in the application software display section 56. When the contract for the license is approved, the corresponding icon is displayed in an updatable manner in the application software display section 56 and the installed-product display section 68. Before the contract for the license is approved, the corresponding icon may be not displayed in the installed-product display section 68.

Figure 23:
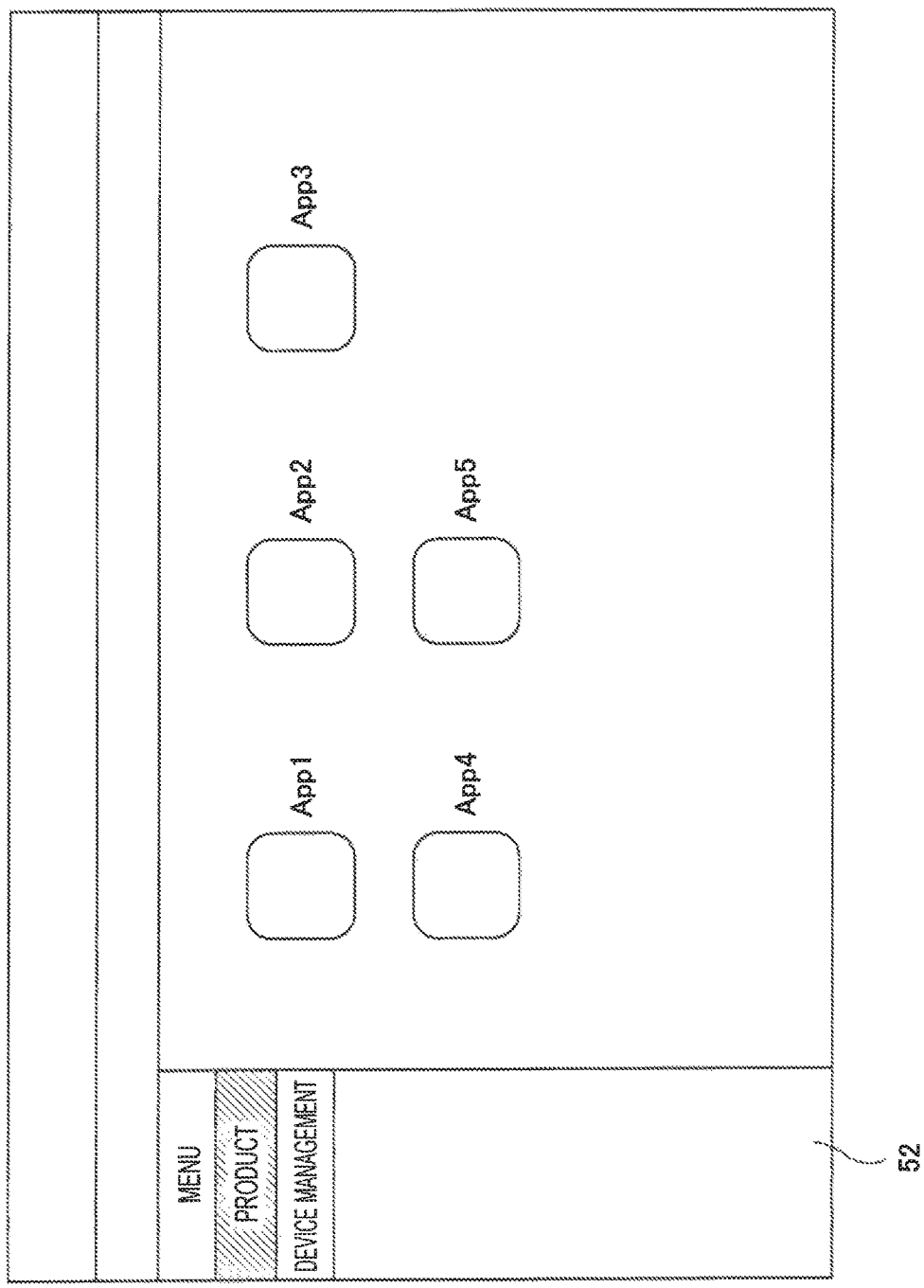
FIG. 23 is a screen diagram illustrating a product purchase screen according to the exemplary embodiment of the present invention.

In the case where the App is of the fee-based type 1 or 2, the number of licenses is increasable by additionally purchasing a license. Specifically, for example, when a "product" tab in the menu display section 52 is clicked from the state in FIG. 8, a purchase screen shown in FIG. 23 is displayed, and an App is additionally purchasable by being selected. When additionally purchasing an App, the number of licenses to be additionally purchased may be designated. The purchased App information is transmitted to the aforementioned owned-license information database 62 and is reflected on the application software display section 56.

Accordingly, although management information about an App owned by a user is stored in the owned-license information database 62, for example, the user himself/herself may sometimes install the App in the device without using the functions of this exemplary embodiment or a serviceman may sometimes install the App without providing a notification.

In such a case, although the App is displayed in the installed-product display section 68, the App is not displayable in the application software display section 56 since the App is not to be managed by the external server 24. If the App is registered in the owned-license information database 62, the corresponding icon is displayed in an updatable manner in the application software display section 56 and the installed-product display section 68. In this case, only updating is possible but other operations are not possible.

In the case where the App is of the fee-based type 2, the number of App licenses as available products is increasable by uninstalling the App. Moreover, the App may be temporarily uninstalled and then be installed in another device. However, in the case of the fee-based type 1, the number of licenses does not increase or decrease even if the App is uninstalled.

Figure 24:
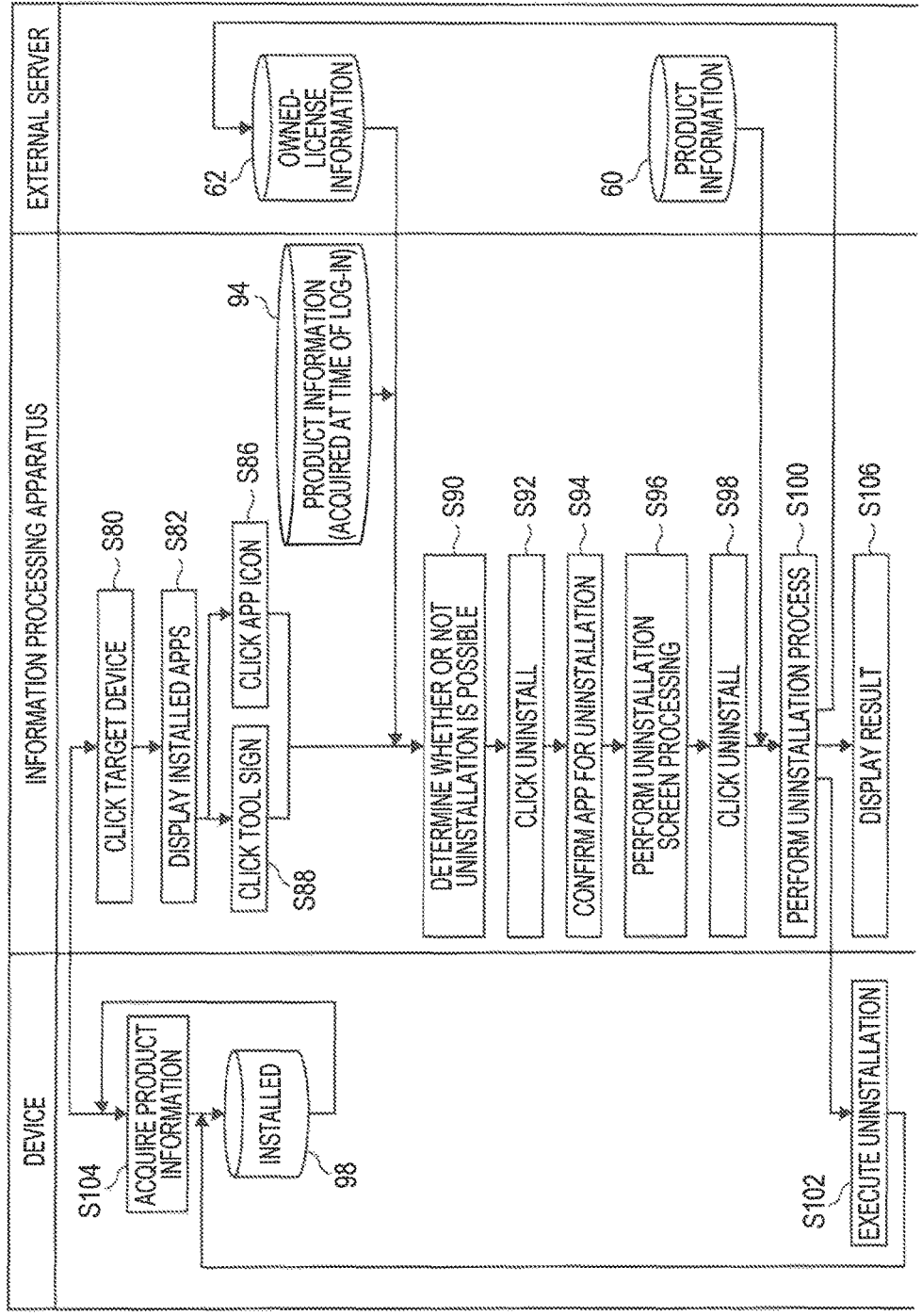
FIG. 24 is a sequence diagram illustrating the second half of a control flow during an uninstallation process in the information processing system according to the exemplary embodiment of the present invention.

FIG. 24 is a sequence diagram when uninstalling an App from a device in the information processing system 10 according to the exemplary embodiment of the present invention.

Figure 25:
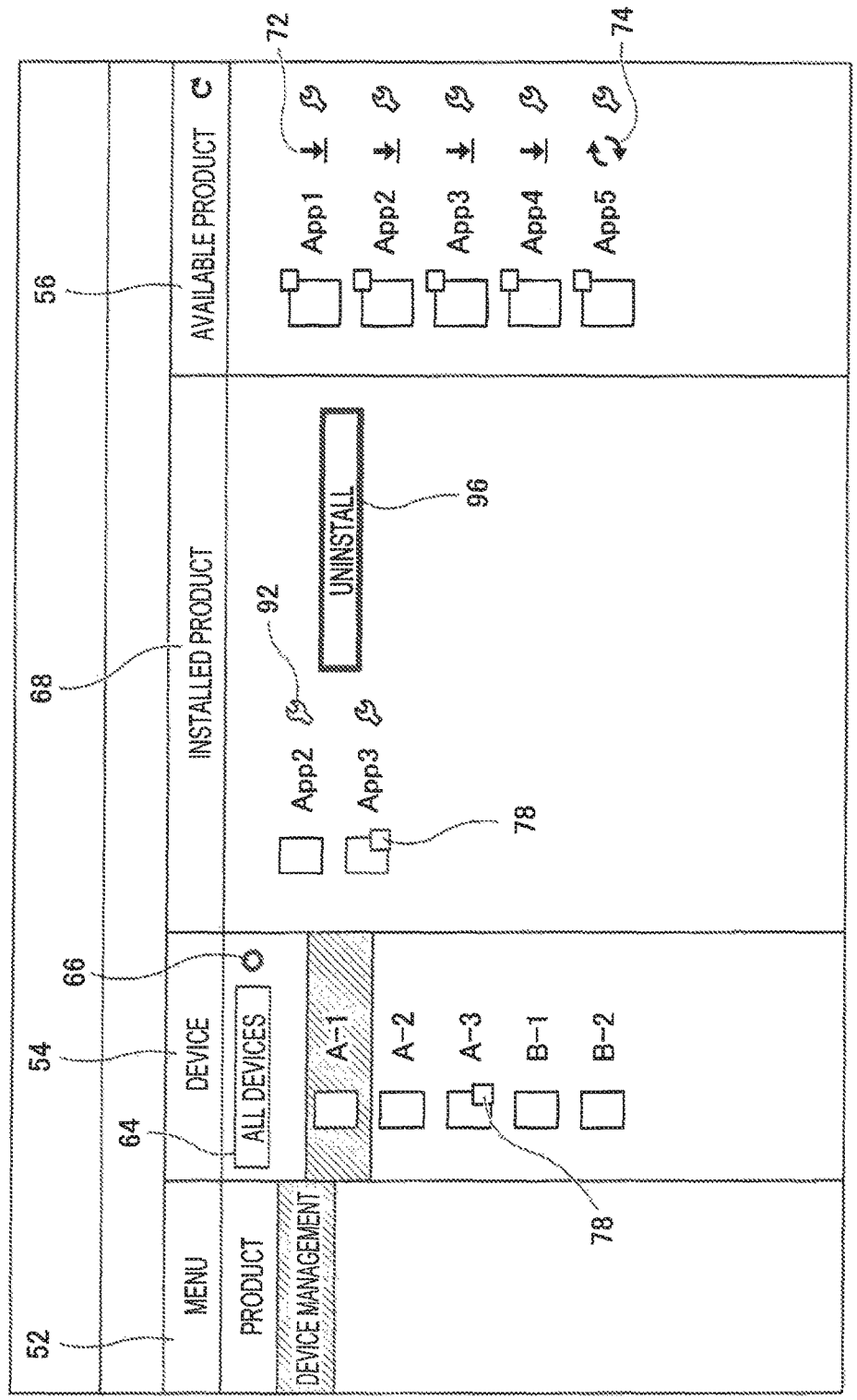
FIG. 25 is a screen diagram illustrating a case where a tool sign is clicked, in accordance with the exemplary embodiment of the present invention.

First, in step S80, a target device is clicked. In step S82, the installed Apps are displayed in the installed-product display section 68 in response to the clicking on the target device, as shown in FIG. 25. Then, a tool sign 92 displayed next to each App to be uninstalled is right-clicked in step S88 or an App icon is clicked in step S86.

In step S90, it is determined whether or not a target App is non-installable. This determination is performed based on information from the owned-license information database 62 in the external server 24 and information acquired at the time of the log-in and stored in a product-information storage unit 94. For example, control is performed such that uninstallation may be performed unconditionally depending on the App or such that uninstallation is possible for that user if there is past installation history.

Figure 26:
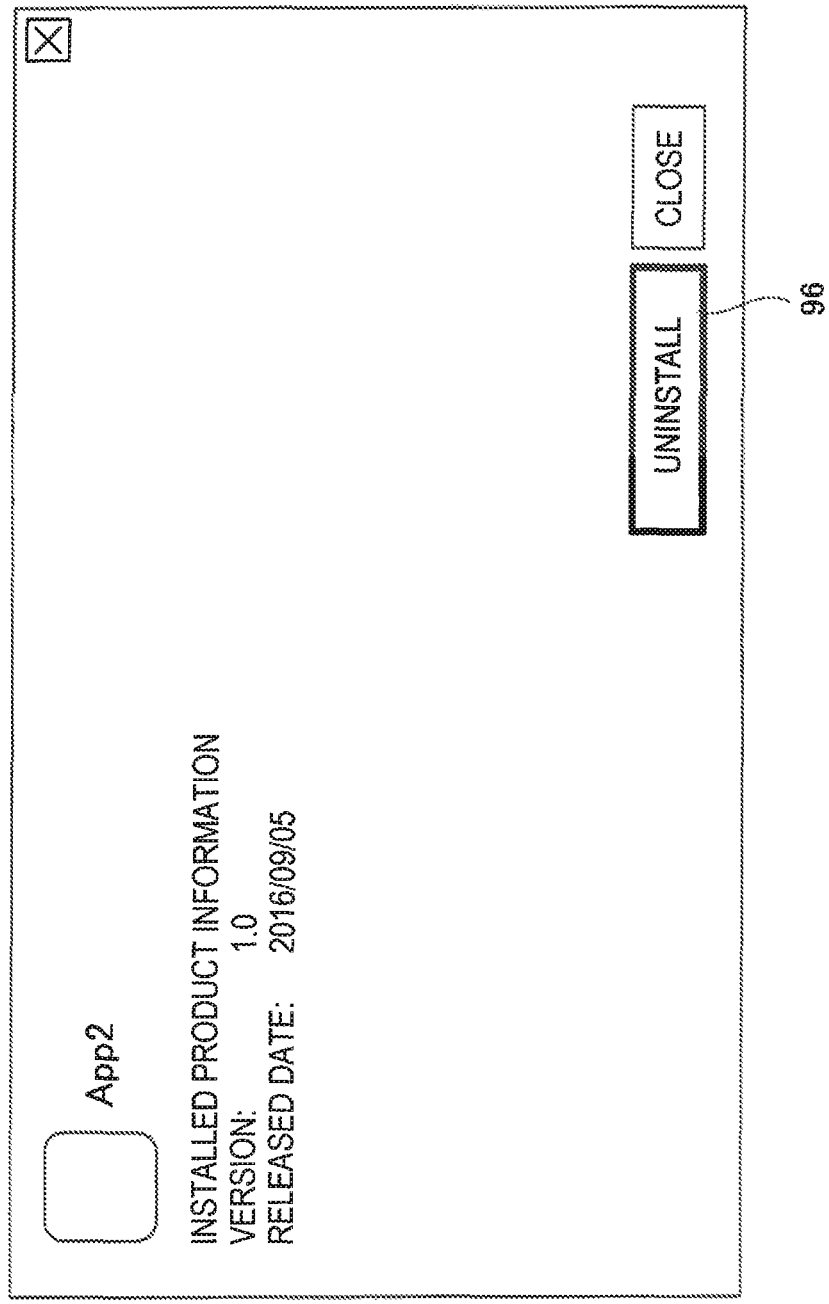
FIG. 26 is a screen diagram illustrating a case where an application software icon is clicked, in accordance with the exemplary embodiment of the present invention.
Figure 27:
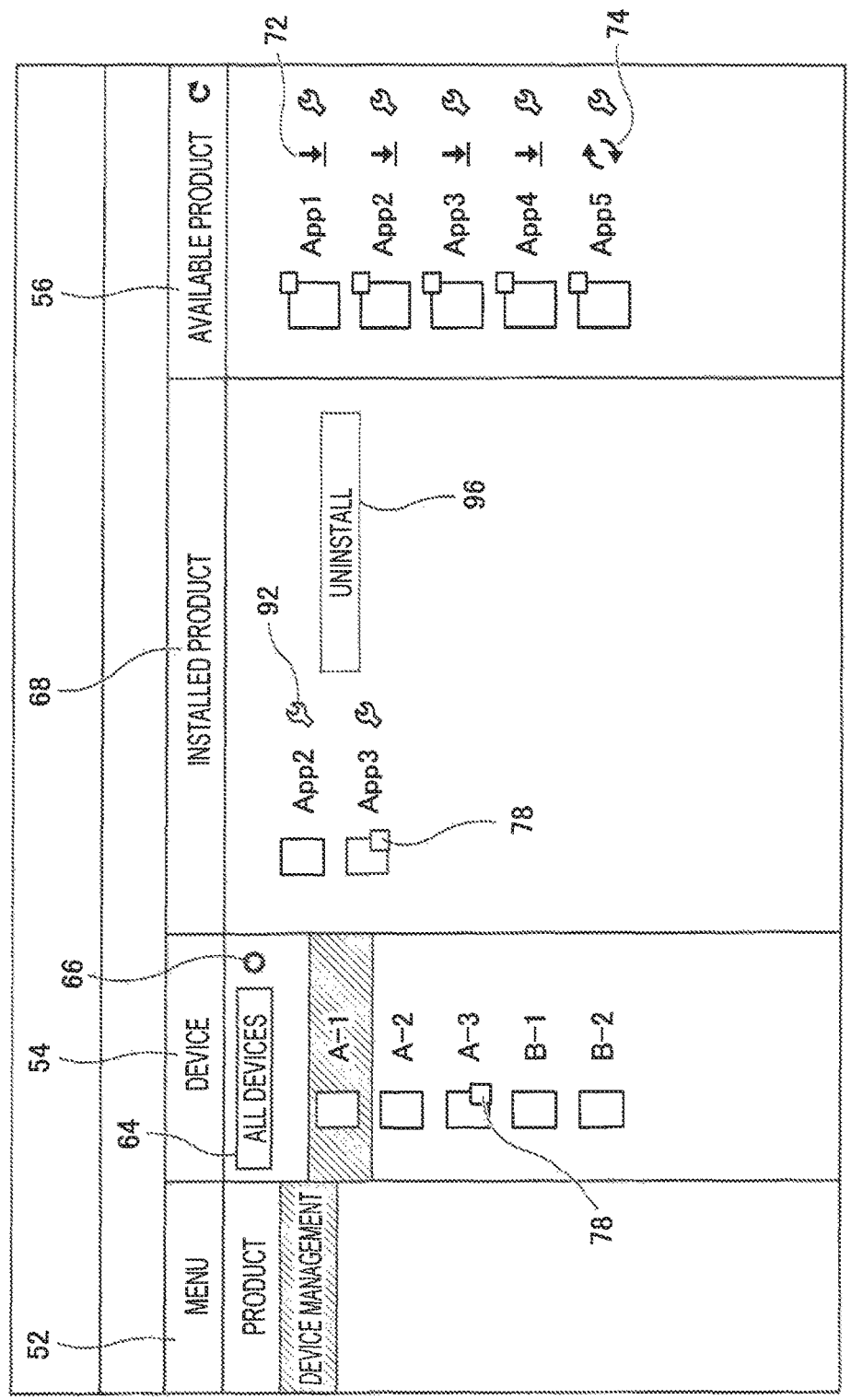
FIG. 27 is a screen diagram illustrating a case where uninstallation is not possible, in accordance with the exemplary embodiment of the present invention.

In step S90, an uninstall display process is performed based on a result of a determination result indicating whether the App is uninstallable. The determination is performed, for example, as follows: (1) if the App is a charge-free type, the App is uninstallable by anyone, (2) if the App is a fee-based type, the App is uninstallable by the user who has installed it, and (3) if the App is a cloud type, the App is uninstallable by the contracted user. Furthermore, an "uninstall" button 96 is displayed, as shown in FIG. 25 in a case where the tool sign 92 is right-clicked in step S88 or as shown in FIG. 26 in a case where the App icon is clicked in step S86. However, in a case where it is determined in step S88 that the uninstallation is not possible, the "uninstall" button 96 is displayed in a grayed-out mode and is thus not selectable, as shown in FIG. 27.

In step S92, the "uninstall" button 96 is clicked.

Figure 28:
FIG. 28 is a screen diagram illustrating a warning, in accordance with the exemplary embodiment of the present invention.

In a case where the target App to be uninstalled is not downloaded, a warning indicating that the target App will be downloaded is displayed in step S94, as shown in FIG. 28. This download may be automatically executed instead of being commanded by the user.

Figure 29:
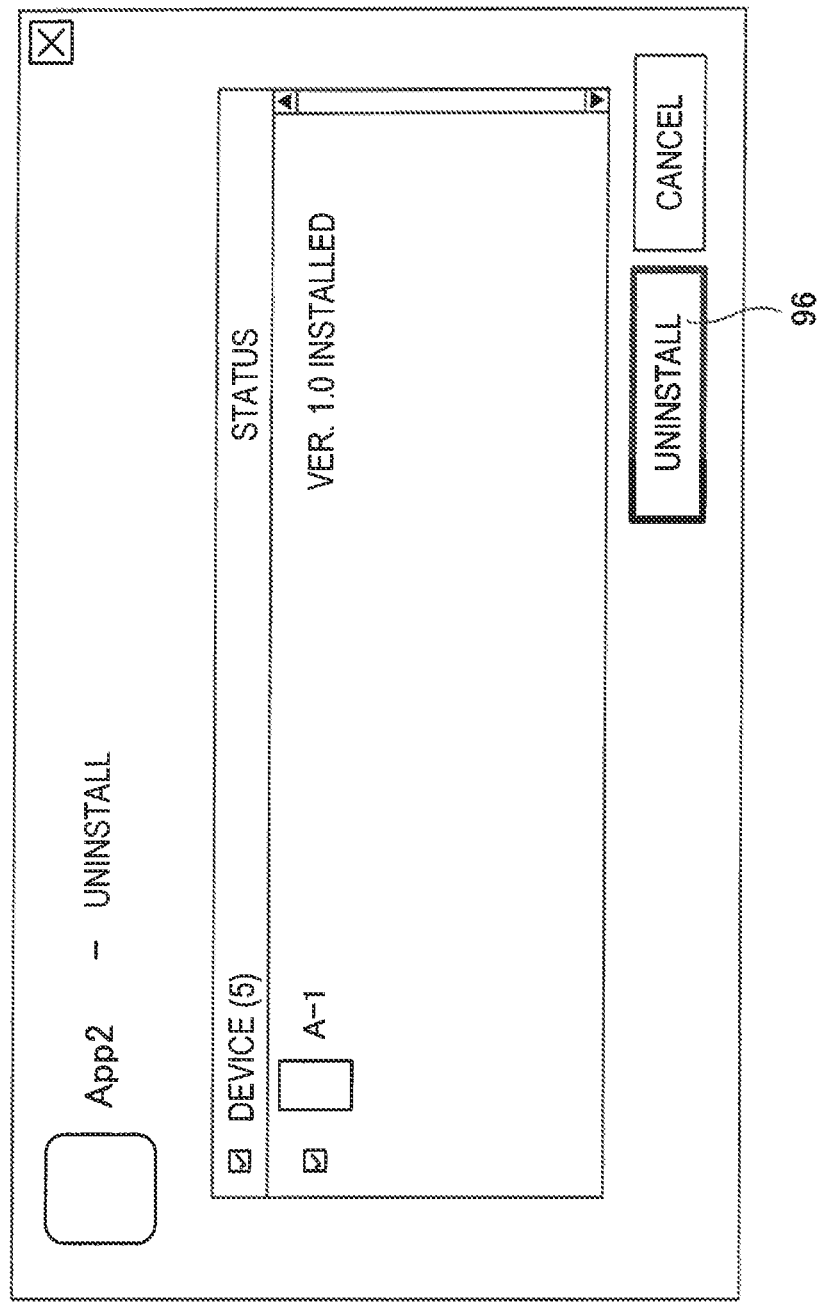
FIG. 29 is a screen diagram during uninstallation, in accordance with the exemplary embodiment of the present invention.
Figure 30:
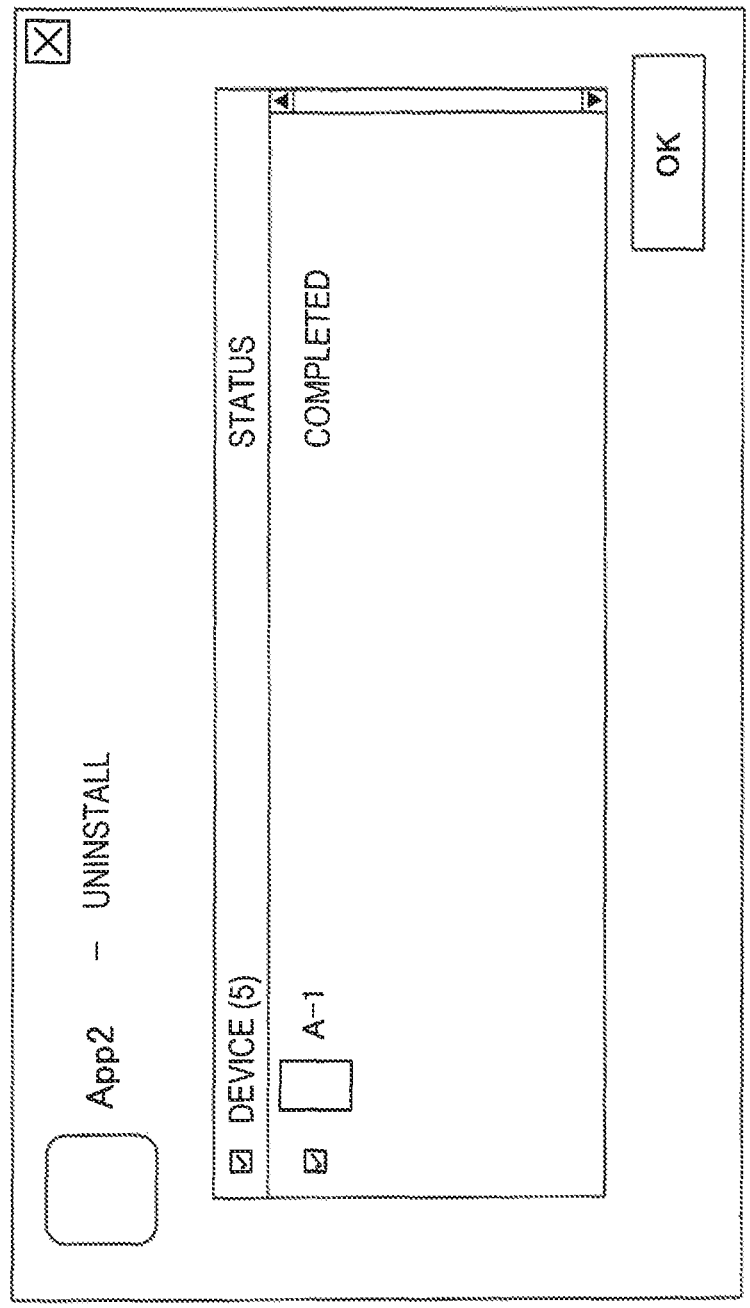
FIG. 30 is a screen diagram when the uninstallation is completed, in accordance with the exemplary embodiment of the present invention.

In step S96, an uninstallation confirmation screen is displayed, as shown in FIG. 29. Then, the "uninstall" button 96 is clicked in step S98, and an uninstallation process is executed in step S100. The uninstallation process involves activating an uninstaller stored in the product information database 60 in the external server 24 and commanding the device to execute uninstallation. The device executes the uninstallation and deletes the relevant installed App from an installed-App storage unit 98 in step S102 and transmits information indicating that the installed App has been deleted to the information processing apparatus 12 in step S104. When the uninstallation process in step S100 is completed, the process proceeds to step S106 where an uninstallation result is displayed, as shown in FIG. 30.

Although the devices in the above exemplary embodiment are image forming devices, the exemplary embodiment of the present invention is applicable to other devices, such as personal computers, portable terminals, or vehicles.

Moreover, in the above exemplary embodiment, an application is installed into a device belonging to a group by dragging and dropping an icon of the application onto an image indicating the group to which the device belongs. Alternatively, if the application indicated by the icon is an application of a new version and an older version of the application is already installed in the device, the old version of the application installed in the device may be updated to the new version of the application by a drag-and-drop operation.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus connected to a device and a server via a network, the information processing apparatus comprising:
a memory;
a hardware central processing unit (CPU) programmed to:
acquire first information related to the device from the device;
acquire second information about application software from the server;
perform control to: (i) display first image information expressing the device of which the first information is acquired, and (ii) when the first image information expressing the device is clicked and activated, display, in a form of a list, second image information expressing the application software of which the second information is acquired, the second image information indicating the application software that is already installed on the device; and
perform control to vary a display mode of at least one of the first image information expressing the device and the second image information expressing the application software between a case where the application software is installable into the device and a case where the application software is not installable into the device;
perform the control to not allow the second image information expressing the application software, the information about which is selected by the user, to be dropped onto the first image information expressing the device into which the application software is not installable;
perform the control to group a plurality of the devices and display the devices;
perform the control to install the application software into one or more of the devices belonging to the group when the user drags and drops the second image information expressing the application software onto third image information expressing the grouped devices; and
perform the control such that the second image information expressing the application software is not droppable onto the third image information expressing the group when the group is constituted only of one or more devices into which the application software is not installable.

2. The information processing apparatus according to claim 1,
wherein, when the user selects the information about the application software, the hardware CPU is further programmed to perform the control to display only a device into which the application software is installable.

3. The information processing apparatus according to claim 1,
wherein, when the user selects the information about the application software, the hardware CPU is further programmed to perform the control vary a display mode between a device into which the application software is installable and a device into which the application software is not installable.

4. The information processing apparatus according to claim 1,
wherein the hardware CPU is further programmed to control installation of the application software into the device in accordance with the user selecting the second image information expressing the application software and the first image information expressing the device, and
wherein, when the application software is not installable into the device, the hardware CPU is further programmed to prohibit the installation.

5. The information processing apparatus according to claim 4,
wherein the hardware CPU is further programmed to perform the control to install the application software into the device when the user drags and drops the second image information expressing the application software onto the first image information expressing the device.

6. The information processing apparatus according to claim 4,
wherein, when the application software is not installable into the device, the hardware CPU is further programmed to perform the control such that an installation command is not transmitted to the device.

7. The information processing apparatus according to claim 4,
wherein, when application software of a version identical to a version of the application software is already installed in the device, the hardware CPU is further programmed to perform the control to prohibit the installation.

8. The information processing apparatus according to claim 4,
wherein, when the user selects image information expressing charge-free application software, the hardware CPU is further programmed to perform the control to prohibit the installation to a device in which a fee-based version of the same application software is already installed.

9. The information processing apparatus according to claim 1,
wherein when the application software is not installable includes at least one of a case where the application software is not supported by the device, a case where application software that is identical to the application software and is of a newer version than the application software is already installed in the device, and a case where software superordinate to the application software is already installed in the device.

10. The information processing apparatus according to claim 1,
wherein, when a device into which the application software is installable is not present in a network, the hardware CPU is further programmed to prohibit an installation command of the application software.

11. The information processing apparatus according to claim 1,
wherein, when a device into which the application software is installable is not present in a network, the hardware CPU is further programmed to prohibit selection of the application software.

12. An information processing system comprising:
a device;
an information processing apparatus that is connected to the device via a network and that processes information for managing the device; and a server that is connected to the information processing apparatus via the network and that stores application software,
wherein the information processing apparatus includes: a memory; and a hardware central processing unit (CPU) programmed to:
acquire first information related to the device from the device;
acquire second information about application software from the server; and
perform control to: (i) display first image information expressing the device of which the first information is acquired, and (ii) when the first image information expressing the device is clicked and activated, display, in a form of a list, second image information expressing the application software of which the second information is acquired, the second image information indicating the application software that is already installed on the device;
perform control to vary a display mode of at least one of the first image information expressing the device and the second image information expressing the application software between a case where the application software is installable into the device and a case where the application software is not installable into the device;
perform the control to not allow the second image information expressing the application software, the information about which is selected by the user, to be dropped onto the first image information expressing the device into which the application software is not installable;
perform the control to group a plurality of the devices and display the devices;
perform the control to install the application software into one or more of the devices belonging to the group when the user drags and drops the second image information expressing the application software onto third image information expressing the grouped devices; and
perform the control such that the second image information expressing the application software is not droppable onto the third image information expressing the group when the group is constituted only of one or more devices into which the application software is not installable.

13. A non-transitory computer readable medium storing a program causing an information processing apparatus connected to a device and an external server via a network to execute a process, the process comprising:
acquiring first information related to the device from the device;
acquiring second information about application software from the server; and
performing control to (i) display first image information expressing the device of which the first information is acquired, and (ii) when the first image information expressing the device is clicked and activated, display, in a form of a list, second image information expressing the application software of which the second information is acquired, the second image information indicating the application software that is already installed on the device;
performing control to vary a display mode of at least one of the first image information expressing the device and the second image information expressing the application software between a case where the application software is installable into the device and a case where the application software is not installable into the device;
performing the control to not allow the second image information expressing the application software, the information about which is selected by the user, to be dropped onto the first image information expressing the device into which the application software is not installable;
performing the control to group a plurality of the devices and display the devices;
performing the control to install the application software into one or more of the devices belonging to the group when the user drags and drops the second image information expressing the application software onto third image information expressing the grouped devices; and
performing the control such that the second image information expressing the application software is not droppable onto the third image information expressing the group when the group is constituted only of one or more devices into which the application software is not installable.

* * * * *